(12) United States Patent
Ohsuga

(10) Patent No.: US 6,171,109 B1
(45) Date of Patent: Jan. 9, 2001

(54) METHOD FOR GENERATING A MULTI-STRATA MODEL AND AN INTELLECTUAL INFORMATION PROCESSING DEVICE

(75) Inventor: Setsuo Ohsuga, Yokohama (JP)

(73) Assignee: Adin Research, Inc., Tokyo (JP)

( * ) Notice: Under 35 U.S.C. 154(b), the term of this patent shall be extended for 0 days.

(21) Appl. No.: 08/878,353

(22) Filed: Jun. 18, 1997

(51) Int. Cl.$^7$ .................................................. G09B 19/00
(52) U.S. Cl. ........................ 434/118; 706/927; 706/16; 706/27; 706/47
(58) Field of Search ................................ 434/362, 323, 434/350, 118, 322; 705/1; 395/500.25; 700/91; 706/927, 16, 27, 47

(56) References Cited

U.S. PATENT DOCUMENTS

| | | | |
|---|---|---|---|
| 5,306,154 | * 4/1994 | Ujita et al. ........................ | 434/219 X |
| 5,820,386 | * 10/1998 | Sheppard, II ..................... | 434/362 X |
| 5,836,771 | * 11/1998 | Ho et al. ........................... | 434/323 X |
| 6,073,054 | * 6/2000 | Katayama et al. ................. | 700/28 X |

OTHER PUBLICATIONS

A. Bijl; "Showing Your Mind," presented at the fourth European–Japanese Seminar on Information Modelling and Knowledge Bases, pp. 1–25, 1994.

H. Yamauchi and S. Ohsuga, Loose Coupling of Kaus with Existing RDBMSs', *Data and Knowledge Engineering*, vol. 5, No. 3, pp. 227–251, 1990.

E. Toppano, L. Chittaro and C. Tasso, Dimensions of Abstraction and Approximation in the Multimodeling Approach, presented at the Fourth European–Japanese Seminar on Information Modelling and Knowledge Bases, pp. 75–89, 1994.

Y. Sumi, R. Ogawa, K. Hori, S. Ohsuga and K. Mase, "Computer Aided communications by Visualizing Thought Space Structure," *Electronics and Communications in Japan*, Part 3, vol. 79 No. 10, pp. 11–22, 1996.

S. Ohsuga, "Multi–Strata Modeling to Automate Problem Solving Including Human Activity," presented at the Sixth European–Japanese Seminar on Information Modelling and Knowledge Bases, pp. 9–24, 1996.

C. Y. Li and S. Ohsuga, "A Meta Knowledge Structure for Program Development Support," presented at the Fifth International Conference on Software Engineering and Knowledge Engineering, pp. 649–656, 1993.

E. Suzuki, T. Akutsa and S. Ohsuga, "Knowledge Based System for Computer–Aided Drug Design," *Knowledge Based Systems*, vol. 6, No. 2, pp. 114–126, 1993.

G. Hans, S. Ohsuga and H. Yamauchi; "The Application of Knowledge Base Technology to CAD," Reprinted from *Expert Systems in Computer–Aided Design* (Edited by J.S. Gero), Proceedings of the IPIF WG 5.2 Working Conference on Expert Systems in Computer Aided Design, Sydney, Australia, pp. 25–55.

R.K. Jullig, "Applying formal Software Synthesis," *IEEE Software*.

J. McDermott, "Preliminary Steps toward a Taxonomy of Problem–Solving Methods," *Automating Knowledge Acquisition for Expert Systems*, (Edited by S. Marcus) Kluwer Academic, pp. 225–56, 1988.

S. Ohsuga and H. Yamauchi, Multi–Layer Logic–A Predicate Logic Including Data Structure as Knowledge Representation Language, "*New Generation Computing*" Ohmshn, Ltd., pp. 403–39, 1985.

S. Ohsuga, How Can Knowledge Based Systems Can Solve Large Scale Problems? Model–Based Decomposition and Problem Solving, Knowledge Based Systems, vol. 5, No. 3, pp. 38–63, 1994.

S. Ohsuga, "Aspects of Conceptual Modeling–As Kernel of New Information Technology," Seventh European–Japanese Seminar on Information Modeling and Knowledge Bases, pp. 1–21, 1996.

A.R. Puerta, S.W. Tu, and M.A. Musen, Modeling Tasks With Mechanisms, International Journal of Intelligent Systems, vol. 8, pp. 129–52, John Wiley & Sons, Inc., 1993.

C. Rich and Y.A. Feldman, "Seven Layer of Knowledge Representation and Reasoning in Support of Software Development," IEEE Transactions on Software Engineering, vol. 18, No. 6, pp. 451–69, Jun., 1992.

N. Zhong, and S. Ohsuga, Discovering Concept Clusters by Decomposing Data–bases, *Data and Knowledge Engineering*, vol. 12, pp. 223–44, 1994.

* cited by examiner

*Primary Examiner*—Michael O'Neill
*Assistant Examiner*—Chanda Harris
(74) *Attorney, Agent, or Firm*—Ladas & Parry

(57) ABSTRACT

The objective of this disclosure is to propose a method of designing an intelligent system assuring autonomy in problem solving to the largest extent. An architecture of a general purpose problem solving system and also a new modeling scheme for representing an object which may include human activity are discussed first. Then a special purpose problem solving system dedicated for a given problem is generated. It is extracted from a general purpose system using the object model as a template. Several new concepts are included in this disclosure to achieve this goal; a multi-level function structure and its corresponding knowledge structure, multiple meta-level operations, a level manager for building general purpose problem solving systems, a concept of multi-strata model to represent objects including human activity, and a method of extracting a special purpose system from a general purpose system and so on. This idea induces a very different view to computer systems from the conventional ones and systems designed according to this idea extend the scope of computer applications to a large extent, e.g., they can solve problems which require exploratory operations. In particular, it is important that this idea leads us to the concept of automatic programming instead of the conventional style of using computers.

3 Claims, 17 Drawing Sheets

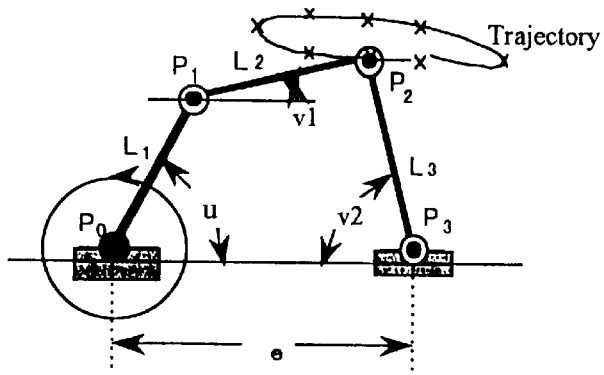
FIG. 3A
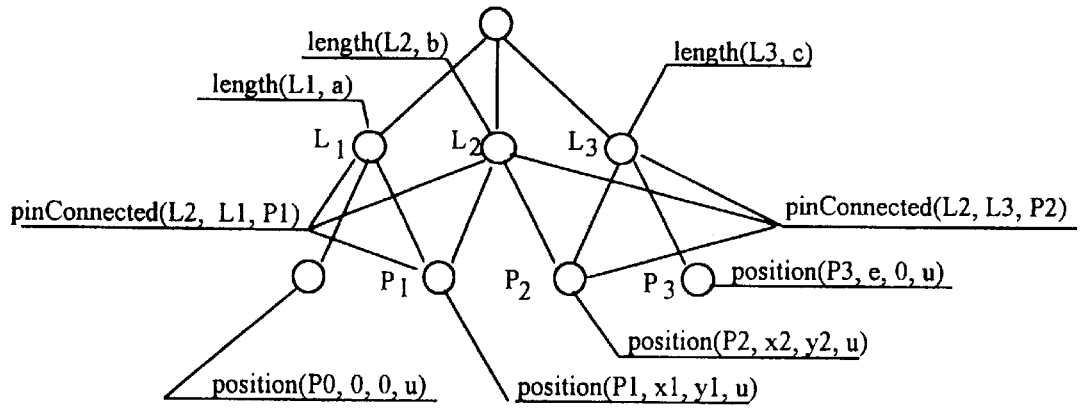
FIG. 3B
Relation among functionalities :
(Ax0, x1, y0, y1, z1, u, r1, r2,)
[position(P1, x1, y1, u) :- position(P0, x0, y0,u), angle(L1, u), length(L1, z1),
                cos(z1, u, r1), sum(x0, r1, x1), sin(z1, u, r2), sum(y0, r2, y1)]
(Ax1, x2, x3, y1, y2, y3, z2, z3, s1, s2, t1, t2/real)(Au/angle)(Ev1, v2/real)
[position(P2, x2, y2, u) :- position(P1, x1, y1, u), angle(L2, v1), length(L2, z2),
                cos(z2, v1, s1), sum(x1, s1, x2), sin(z2, v1, s2), sum(y1, s2, y2),
                position(P3, x3, y3, u), angle(L3, v2), length(L3, z3),
                cos(z3, v2, t1), sub(x3, t1, x2), sin(z3, v2, t2), sum(y3, t2, y2)].
Query;
    angle := (a1, a2, a3, ----, aN)
(Au/angle)(Ex/real)(Ey/real) position(P2, x2, y2, u)
FIG. 3C

M-Rulei ; Meta-Rule i
 M-Rule1 characterizes the set (O-Rule1, O-Rule3, O-Rule6)
 M-Rule2 characterizes the set (O-Rule2, O-Rule3, O-Rule5)
 M-Rule3 characterizes the set (O-Rule4, O-Rule6, O-Rule7)
 --
 M-RuleK characterizes the set (O-Rule5, O-R-le7, O-RuleN)

O-Rulej ; Object-Rule j

Basic Form;
  pred(X  Y)    (a)
Extension;

(Extension 1)   (b)

=    D = ◯ ····· pred( D Y)    (c)

(Extension 2)

$$\frac{\text{pred}(\text{pred}'(X)\ Y)}{} \quad (d) \quad = \quad \frac{p = \bigcirc \cdots\cdots \text{pred}(p\ Y)}{\text{pred}'(X)}$$

(e) level i+1
level i (Extension 3)

(f)   =   D = ◯ ······ pred(D Y)    (g)

pred'(X1) ······ pred'(Xm)    pred'(X1)  ······ pred'(Xm)

level i+1
level i

METHOD FOR GENERATING A MULTI-STRATA MODEL AND AN INTELLECTUAL INFORMATION PROCESSING DEVICE

BACKGROUND OF THE INVENTION (1) Field of the Invention

The present invention relates to a method for intellectually processing an information and an apparatus for carrying out the method and, in particular, a method for building knowledge base and an intellectual information processing device used in solving problems.

The objective of this disclosure is to propose a new computer system which is truly intelligent and behaves like a person at problem solving. Here the term problem solving is used in a very wide sense to mean every activity to derive answer meeting given conditions in a given environment.

(2) Description of the Prior Art

There have been a lot of systems which have been called intelligent. The inventor however does not know any truly intelligent system. A person can develop computer programs, for example, because he/she is truly intelligent. There is no such a system that can do in the same way as the person. As a goal of this research therefore, the inventor intends to develop a system that can develop computer program as a person does.

There is a big difference in the organization and the functional characteristics between person and computer. For some specific problems computers have larger problem solving capability than individual persons. However these computers become unable to solve a problem if the problem itself or some condition based on which the computer program was developed change even slightly. A computer program as a problem solver is compared to a very thin rigid wire connecting the start and goal of a given problem without capability of self adjusting. Even with this rigid characteristic a computer program can reach a goal at a long distance from the start if the program is carefully made and no change occurs. But making such computer programs is itself a problem of a different type which cannot be solved by the computer program itself. That is, this style of problem solving can cover only a special type of problems.

Persons on the other hand can adapt to the change of the situations to a large extent. With the similar metaphor as applied to computers, problem solving by persons is like a broad and flexible belt with capability of adjusting itself to direct toward goal. Collaboration of persons is much easier with this adaptability while collaboration of two or more problem solvers of which at least one is a computer program is not easy. The total power of persons who collaborate for solving problems, i.e. both the depth (the scale and complexity of problems to be solved) and breadth (diversity of problems to be solved), is far greater than that of a computer program, even though an individual person has less power than elaborated computer programs have for specific problem solving.

Thus the largest difference between persons and computers in problem solving is the adaptability to different and changing situations, i.e., autonomy in solving rather complex problems (not toy-level problems including programming) and generality to include the wide range of activities in the actual scope. If computer systems happen to acquire both generality and autonomy in solving real problems without other's help, then the systems will be able to collaborate with other systems and/or persons to create greater power.

Generality and autonomy were the objectives of expert system design. But most of the expert systems which have been developed so far showed generality and autonomy only in a limited extent. This is due to the lack of the consideration on making computers truly intelligent and, as the result, the software architecture of these systems were too simple to give them generality and autonomy. In addition to expert systems some attempts were made to develop intelligent systems such as electronic secretary systems. The same characteristics are required to these systems as discussed above but no substantial discussion has been made on the way of building such systems.

SUMMARY OF THE INVENTION

Thus the goal is to give computer systems autonomy and generality comparable with those of persons so that they can behave like persons. Key problems which must necessarily be considered in order to achieve the goal are as follows:

(1) How to aid persons for externalizing their ideas ?

(2) How to assure the generality and autonomy for solving large and complex real problems ?

(3) How to meet the time requirement as well ?

The first problem concerns with cognitive aspect of persons. It is important because problems are generated by persons and the computer's role is to aid the person to solve them. The second and third issues are concerning with the methods of problem solving. The second problem requires the development of a general and autonomous problem solver. It must be very different from those developed in the past such as GPS (general Problem Solver) because the problems to be considered are far larger and more complex than those dealt with by these systems. A new technology to solve complex problems must be developed. The third issue is indispensable for making computers practically usable. It is believed that there is a trade-off between generality and time requirement of processing. What is required here however is not a matter of balancing but a new method to fulfill the requirements for both generality and processing time.

The commonly known intellectual information processing device having a general purpose knowledge structure has a disadvantage in that a performance for solving a specific problem is degraded, as the device increases its generality.

Therefore, in order to overcome the above-mentioned disadvantages of the known art, an object of the present invention is to provide a method for building a model used for retrieving some knowledge from the generic purpose knowledge base.

Another object of the present invention is to provide an intellectual information processing device for solving a problem represented in a form of a model by extracting parts of the generic purpose knowledge base by means of the model.

According to the present invention, the above-mentioned object is achieved by a method for generating a multi-strata model for modeling not only objects but activities of subjects including persons in an information processing device for solving problems, the method comprising the steps of:

(a) defining a first level subject and a first level object associated with the first level subject and building a first level model from the first level object in response to a said first level subject's interest, said first level being corresponding to a first level of problem solving levels; and (b) defining a second level subject as well as a second level object, and building a second level model representing said second level object on the basis of an analysis of activities of said first level subject for solving first level problems with respect to said first level object, said second level being corresponding to a second level which is one level higher than said first level of the problem solving levels and said second level object representing activities of said first level subject during a building of said first level.

The another object of the present invention is achieved by an intellectual information processing device for solving a problem represented in a form of a model, comprising an intellectual function knowledge base which is structured such that an upper layer function corresponding to a more complex function is represented by lower layer corresponding to less complex function, the device further comprising:

a means for building a multi-strata object model hierarchically representing a relation between a subject for solving a problem and an object associated with the subject;

a problem solving means for selecting some knowledge from said intellectual function knowledge base in accordance with a situation to be concerned and sequentially modifying said model based on the selected knowledge, thus achieving a final model for creating a solution of the problem; and a means, in response to a request supplied to an upper level subject in the multi-strata object model, for extracting some parts of said intellectual function knowledge base and generating a problem-specific solving machine for replacing a lower level subject in the multi-strata object model.

Thus the goal of this invention is a new, general purpose intelligent computer system that behaves like a person at problem solving for a wide range of problems, especially for programming. Basic concept underlying the system is in modeling. Two very new methods are included in this disclosure in order to achieve this goal. One is to build a very generous problem solving system and the other is a modeling scheme to define a model that behaves like a person at problem solving so that even such tasks that should have been dealt with by knowledge engineer in the other systems can be processed by the system itself.

BRIEF DESCRIPTION OF THE DRAWINGS

The above and other objects, features, and advantages of the present invention will be more apparent from the following detailed description when read in conjunction with the accompanying drawings, in which:

FIG. 3A shows a simple link mechanism used in various mechanical systems;

FIG. 3B shows an object model representation of this link mechanism of FIG. 3A;

FIG. 3C illustrates some formula to represent a relation among functionaries and query;

DESCRIPTION OF THE PREFERRED EMBODIMENTS

1. INTRODUCTION

Figure 1:
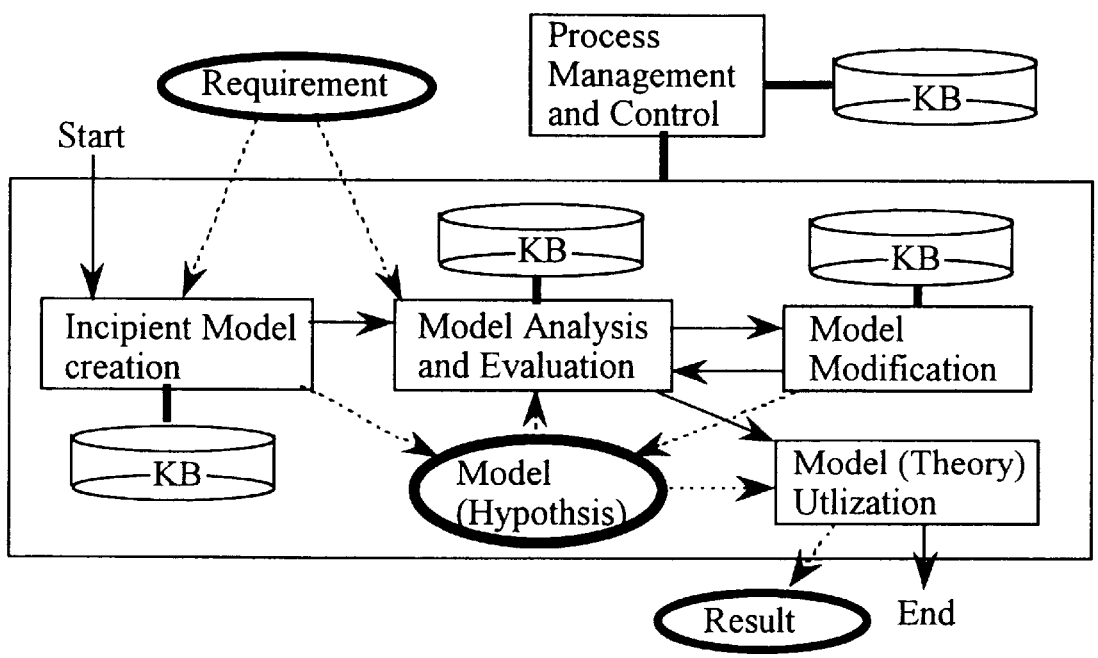
FIG. 1 is a schematic diagram illustrating an exploratory problem solving method.

The basic concept underlying the former part of the work presented here is similar with PROTEGE II, a knowledge-acquisition shell that uses problem-solving methods to derive the modeling of tasks, as described in A. R. Puerta, S. W. Tu, and M. A. Musen, Modeling Tasks with Mechanisms, International J. of Intelligent Systems, Vol. 8, 129–152, 1993. This system is rooted on the former research works such as J. McDermott, Preliminary Steps toward a Taxonomy of Problem Solving Methods, Automating Knowledge Acquisition for Expert Systems, (S. Marcus ed.) Kluwer Academic, 225–256, 1988 and M. A. Musen, Conceptual Models of Interactive Knowledge Acquisition Tools, Knowledge Acquisition, 1. 73–88, 1989. Those works, and the work presented in this disclosure too, build a method of problem solving for the given problem. There is however a big difference between them.

The major difference is in the way of making the methods of problem solving and accordingly the modeling concept itself. In the works referred above the method is made by human knowledge engineer.

The work presented here, on the other hand, uses a new modeling scheme that replaces the knowledge engineers by representing their roles. The inventor believes that end-user computing, i.e. such computer systems that enable users do everything, becomes possible only with this framework. This framework also enables us to define formally some sophisticated works like programming.

Consequently there is also a big difference in the approaches to computerized programming between the research work dealt with in this disclosure and the other works like R. K. Jullig, Applying Formal Software Synthesis, IEEE Software, 11–21 and C. Rich and Y. A. Feldman, Seven Layers of Knowledge Representation and Reasoning in Support of Software Development, IEEE trans. on Software Engineering, Vol. 18, No. 6, June, 451–469, 1992. All research works made so far are based on the belief that programming is the role of persons. As the consequence these works are directed to computer aided programming systems from the beginning.

A preferred embodiment of the present invention leads us to the concept of automatic programming.

In this disclosure of the preferred embodiment, human-computer interaction is first discussed in Section 2. This is necessary because in the system presented here some part of tasks that have been considered responsible to a person are moved into the system and therefore the roles of computer systems and persons must be clearly defined.

In Section 3, a method to develop a general purpose problem solving system is discussed. A part of this discussion has already been published in S. Ohsuga, How Can Knowledge Based Systems Can Solve Large Scale Problems—Model Based Decomposition and Problem Solving, Knowledge Based Systems, Vol. 5, No.3, 1994 (hereinafter referred to as [OHS94]), S. Ohsuga, A Way of Designing Knowledge Based Systems, Knowledge Based Systems, Vol.6, No.1, 1995 (hereinafter referred to as [OHS95a]) and S. Ohsuga, Aspects of Conceptual Modeling—As Kernel of New Information Technology, Proc.Fifth European-Japanese Seminar on Information Modelling and Knowledge Bases, 1995 (hereinafter referred to as [OHS95b]). Therefore some key concepts are presented.

Section 4 discusses a new modeling scheme to represent systems including persons. Modeling concept named Multi-Strata Model, a way of representing an object in this scheme, a way of processing the model and some examples that need this modeling scheme are presented.

Finally, automatic programming as an important application of this method according to the present invention is discussed in section 5. The objective of this section is not to discuss automatic programming to the detail but to show that the whole processes of making program can be represented and processed in the system.

Furthermore, in order to represent these new concepts, new language becomes necessary. A language has been developed by inventor's group and named Multi-Layer Logic (MLL), as described in H. Yamauchi, KAUS6 user's Manual, RCAST, Univ. of Tokyo, 1993 (hereinafter referred to as [YAM93]). This is an extension of predicate logic including various data structures and limited class of higher order expression. Every variable is defined in a specific domain in MLL. Thus the form of $(Qx/d)P(x)$ is used in which Q denotes a quantifier (either A for all or E for some) and the variable x is defined in the domain d. This predicate is read "For all (or for some) x in d, $P(x)$". Inference rule is defined for this expression (Table 1 in section 5.3.3). An outline of MLL is shown in Appendix. The expression used in this paper however does not follow exactly to the syntax of MLL but rather closer to ordinary mathematical way of expressing predicate logic. It is because of making easier to understand for the readers.

2. HUMAN-COMPUTER INTERACTIONS

There is a substantial difference in the role between computer and person in cooperative problem solving, since problems are always created by persons. New intelligent computer systems must be able to stand on the same basis as persons in the functions other than problem creation. It is expected that, after a problem is given, the computer can take the initiative in the succeeding problem solving by making a plan, decomposing a large problem into parts, building models and so on. It reduces the burden of the person to a large extent. This is the meaning of autonomous problem solving by computers.

With such computer systems the human-computer relation changes drastically from the conventional one in which the person takes the initiative and the computers can take part in fragmentally in the total problem solving process. In program development in the ordinary style for example, CASE is used only in some parts of a total process of making specification, planning, designing, and coding. It cannot be expected that the rate of computer's aid increase over a certain level with this style. The only way to increase the rate is that the computer accepts the problem at as early stage as possible and solves it autonomously as far as possible.

There are two types of interactions between person and computer. One is essential interaction and the other is non-essential but unavoidable interaction. Since the problem originates from person, it must be transferred to the computer at some point of problem solving process and the answer must be sent back. These interactions are essential. After the computer accepts the problems it can solve them if its problem solving capability is large enough. Otherwise it cannot solve problems completely in an autonomous way but needs person's help. This interaction however is not essential because, the larger capability the computer acquires, the less the necessity for the interaction becomes. This interaction is not essential but unavoidable. The objective of intelligent system design is to reduce the unavoidable interaction, i.e., to automate problem solving as far as possible.

These interactions correspond to the different stages of problem solving; creation of a problem and solving the problem. An ideal style of cooperation is to separate these parts in a total problem solving process, and to automate the second part as far as possible. In reality, it is difficult to achieve because human thinking is quite nebulous and it is very often difficult for everyone to state one's idea/problem clearly at a time. Some part of information may remain in one's brain. This information must be excavated later in the problem solving stage. The person may not note that his/her problem definition is incomplete until the computer stops and ask the person to supply it. Moreover, in the second stage, the computer cannot be completely autonomous because of the lack of power of solving problems. Thus in order to approach the above goal, the following two technologies must be developed and implemented.

[P1] to aid person to clarify his/her idea/problem and to externalize it, and

[P2] to accept person's idea/problem and find its solution autonomously.

Let these be called Externalization and Exploration phase, respectively.

Externalization has been considered completely the human party's role so far. The objective of this work is to replace it by a collaborative operation. The computer technology for this collaboration includes stimulating and aiding the person to clarify his/her idea/problem in mind, to form conc pt, and to represent the concept explicitly.

For the problem [P1] above, Hori is making research, as described in K. Hori, A system for aiding creative concept formation, IEEE Transactions on Systems, Man and Cybernetics, Vol.24, No.6, 1994 (hereinafter referred to as [HOR94]). This research concerns with a study of creativity.

Exploration on the other hand is a basis of autonomy. It includes various technologies to look for and to find solution for the given problem autonomously. Generality, flexibility and practicality are required at exploring. These are the requirement for the system to adapt to the different situations, even unexpected ones, and to generate proper response to the real problems (not toy problems) in the time.

Generality requires the system to be provided with large amount of knowledge that covers different domains in order to adapt to the different situations and to deal with different problems spanning these different domains. Flexibility requires high level capability of the system to control the process as depending on the characteristics of problems. Practicality, on the other hand, requires the system to solve real problems within a practical time limit. In general, the more general a system becomes, the longer the time is required for problem solving. Thus these requirements sometimes contradict to each other. A technology based on the new idea must be developed here for dissolving these contradictory requirements.

This invention concerns mainly with this problem.

Ohsuga made research on problem [P2] such as on the way of decomposing large scale problems (refer to the above-mentioned [OHS94]) and of designing general purpose knowledge based systems (as described in the above-mentioned references [OHS95a], [OHS95b]). Though this research is not satisfactory yet to solve the above problems completely these works are surely making steps to the goal.

This is the discussion from the standpoint of making computer systems autonomous as far as possible. Computer users may wish to interact and make decisions themselves positively while solving problems. The discussion in this section does not mean to exclude these interactions.

3. GENERAL PURPOSE PROBLEM SOLVING SYSTEM(GPPSS)

The condition of a problem solving system being a general purpose system is that it should be able to deal with different types of complex problems in the same system. There are various types of problems, other than those rather simple problems that evaluate given functions: such as design, control, decision making, diagnosis, planning, scheduling, teaching and so forth. Most of them are not well dealt with by conventional programming method but require an activity that finds a goal in a solution space. Since the space is not limited and the goal is not foreseen beforehand for most of these real problems, self controlled exploration in the space is necessary. The system must be provided with the various methods to solve the different type of problems, be able to identify itself the type of the given problem, and be able to organize itself so as to fit to the type of problem.

In addition, since a complex problem can cover different problem domains and each problem requires domain specific knowledge, the system must be provided with a lot of knowledge covering the different domains and also with the capability to extract only the necessary knowledge therefrom for the problem in hand which the system is actually required to solve. For this purpose knowledge must be well structured so that only the necessary parts for solving problem in hand can be identified. This is discussed in the following sections.

3.1 Exploratory Problem Solving

Problem solving system must be able to solve different types of problem, especially such problems as requiring exploration, in order for assuring its generality and autonomy. It should also be generic to cover a wide area of problem domains. Human being use a general method of problem solving known as the scientific method today. In this method a problem is represented explicitly, is analyzed and evaluated whether it satisfies the given requirements, and if not, it is modified. This analysis/modification process is repeated until the goal is reached. Knowledge is used for promoting this process. Representing this method explicitly and giving it to computer systems is necessary for achieving the goal mentioned above. This method is formalized and represented as shown in FIG. 1.

This approach is adopted partly in the known Black Board model which have shown a wider applicability than any other expert systems. But it is still problem dependent because knowledge sources and their management must be specified by human experts to each specific problem.

In FIG. 1 the different blocks represent the different operations. Every operation is realized as a common deductive operation applied on a specific knowledge chunk. Since the solution space is not limited and unknown beforehand, there must be a function for guiding and controlling the exploration. The parts located outside of the block (main part of problem solving) in FIG. 1 represents this concern. In order to achieve this, the system uses various strategies to make the exploration area as narrow as possible in the space while assuring that the solution is still included. The operation inside the blocks are dependent on problem domains though this problem solving scheme itself is common to a wide class of problem domains.

3.2 Object Model

Every problem must be represented explicitly in order to be solved in this scheme. Object model plays an important role here. It has many aspects. First of all, it is a representation of the problem as a requirement to be met. It is modified until a representation is reached which is accepted by the person as being a solution. Thus the model represents a state of problem solving process at every instance of time and a solution in its final state. Every decision is made on the basis of the model representation at the time. The incipient stage of this process, namely building an object model for the first time, requires a person to externalize his/her idea/demand. This is the externalization stage. In the remaining process the model is modified repeatedly looking for a solution. This is the exploration. Thus model plays a central role in the whole process of problem solving, and externalization and exploration are combined by the object model. A modeling scheme meeting this condition must be defined. A model is a representation of an object in the world which person has interest in and wishes to know about, and therefore it is called an object model.

It is desirable that a single modeling scheme be able to generate different object models. Since different models are necessary for representing not only different problems but even a single problem (as will be shown later), the generative power of the modeling scheme must be large enough. Generally speaking, an object model has structural information to represent a structural organization of the object from its components as well as a set of functionalities represented formally in relation with the object structure. Here the term 'functionality' represents all the attributes, properties, functions, behavioral characteristics under the specific environment of the object, each of which is represented by a predicate. Furthermore, relations among the functionalities define the activities of the object.

An object structure is composed of components by two kinds of relation; is-a relation and part-of relation. Based on the part-of relation a hierarchical structure is built from the components as a skeletal structure. Every component or the object itself is linked with the other entity not included in the hierarchy by the is-a relation. In this structure various predicates are given to represent functionality each of which is linked to the related components. These predicates are related to each other by some additional formulas which represent the constraints as introduced into the components in the object model. In addition to these, these components or the object inherit functionalities from the entities to which they are linked by the is-a relation. An object has various functionalities and it is almost impossible nor necessary to list them exhaustively. Instead, only some functionalities in which the person has interest are included. Among them those represented by two (or more) place predicate specify binary relations of structural components. In many cases the binary relations of the same type represented by the same predicate hold between the pairs of components in the same hierarchical level. This defines a graph in the structure.

Figure 2:
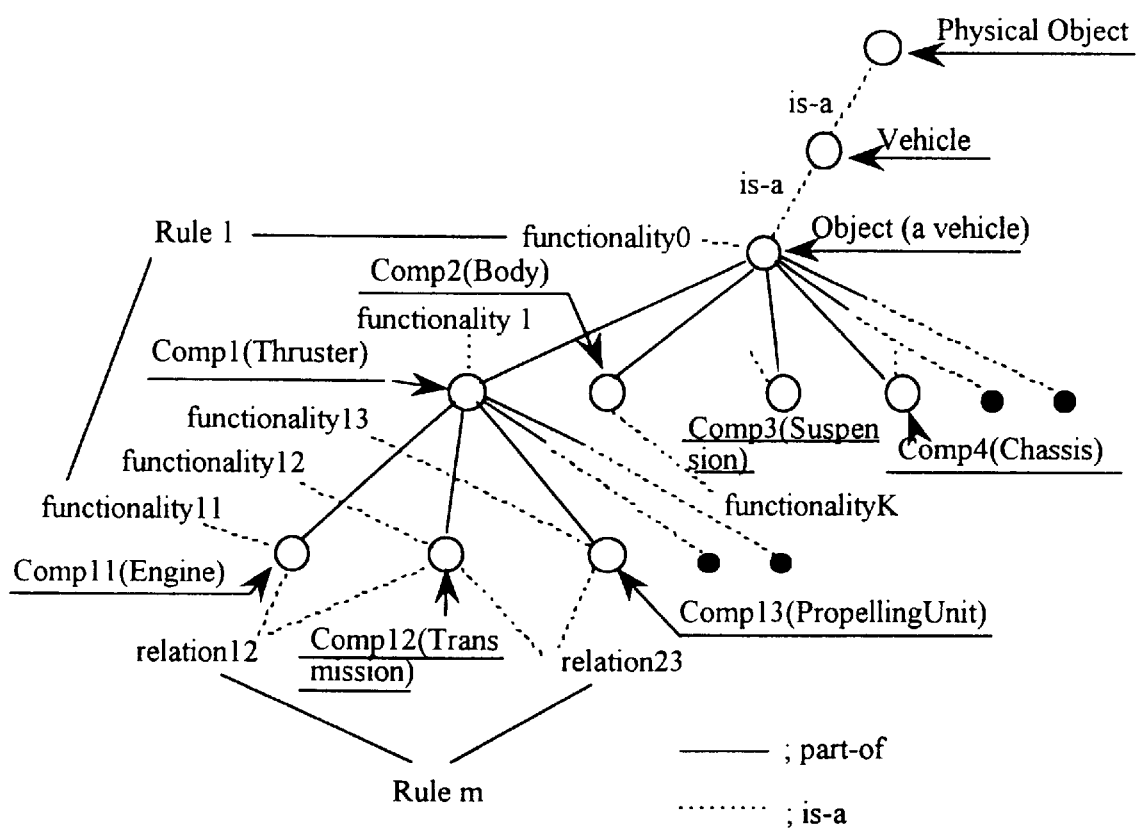
FIG. 2 illustrates an object model that fits into a common scheme.

In this case, instead of giving a predicate to every pair, a list of pairs is made to form a database and a predicate is provided to give a meaning to this database and to relate it with the object model structure, as described in H. Yamauchi, and S. Ohsuga, Loose Coupling of KAUS with Existing RDBMSs, Data and Knowledge Engineering, Vol.5, No.3, 1990 (hereinafter referred to as [YAM90]). In this way databases can be incorporated in the model representation. An illustration of model that fits into this common scheme are shown in FIG. 2. The characteristics of this modeling scheme is discussed in S. Ohsuga, Multi-Strata Modeling to Automate Problem Solving Including Human Activity, Proc.Sixth European-Japanese Seminar on Information Modelling and Knowledge Bases, 1996 (hereinafter referred to as [OHS96]).

Some items in this model representation, either the component structure or the functionality structure (or both), may be unknown though their existence is anticipated. This represents a problem. For example, if a set of functionalities is assumed to an object but its part-of structure is not known, the model represents a design problem. Since some node does not exist at the beginning the required functionality is given to the known upper node tentatively and moved to the related nodes as the hierarchical structure is gradually formed as design proceeds.

Different type of problems can be represented in this modeling scheme, depending on which is the unknown component among Functionality, Object-Structure, and Value in the form of Functionality (Object-Structure, Value), or simply F(O, V), read as "Functionality of Object-structure is Value". Different methods are necessary for solving different types of problems because of the different directions to follow between structure and functionality. In general, structure-to-functionality relation is one-to-one but the functionality-to-structure relation is one-to-many.

For the first case above, i.e. F(O, V), because of the one-to-one relation of structure-to-functionality, the solution is determined uniquely. The term in Italic denotes an unknown term. For the other cases the problem is non-deterministic because of one-to-many relation of the functionality-to-structure relation for the case F(O, V). This scheme covers even the case in which a name of functionality is not known though data show its existence. Let it be represented F(O, V) and require to create a functionality from a set of instances. A hypothetical functionality (with its tentative name) is created and tested if it explains all observations. If it does not, it is modified and this process is repeated, as described in N. Zhong, and S. Ohsuga, Discovering concept Clusters by Decomposing Data bases, Data and Knowledge Engineering, Vol.12, 1994. The first one belongs to non-exploratory problems and the second and third ones belong to exploratory problems.

Let us explain this by an example of object model as shown in FIGS. 3. FIG. 3A shows a simple link mechanism used in various mechanical systems. In this example, it is composed of 3 bars. The bars are linked by the pin joints to each others. The both ends $P_0$ and $P_3$ are connected to the ground also by the pin joints. The bar L1 is rotated by a motor. The other bars follow this motion under the constraint produced by the other bars. An object model representation of this link mechanism is shown in FIG. 3B. The object structure is composed of the system, bars, terminal-points hierarchy. Some functionality like the bar length, point locations are shown. In addition, there must be some formula to represent the relation between these simple functionalities as shown in FIG. 3C to define the operation of the object.

Let us assume that a question "what is the trajectory of the point P ?" is given. It is represented as trajectory(link-mechanism, P, value) where both the link-mechanism and the point P are given and value is an unknown term. In general the trajectory is a continuous line. However let it be replaced by a series of points. Then this question is decomposed to a series of questions to obtain a location of the point P for the different rotation angles of the bar L1. The prefix (Au/angle)(Ex/real)(Ey/real) in the query predicate represents this requirement. This expression is translated into a loop operation when this problem is translated into a procedural program as will be discussed in Section 5.

Another type of question such as to find a link mechanism that generates a specified trajectory is possible. For example, a link mechanism is required to move the point P in a region R in the space. The region R is a part of space surrounded by obstacles. In this case a question in the form of [trajectory (link-mechanism, point, value), in(value, R)] is asked. This example is very simple, but this modeling scheme can be used for different scale and complexity of objects.

Thus problems are represented by means of a model. From a different point of view, each model is also a representation of one's idea in terms of an object in which the person has interest. Externalization system aids a person to represent his/her idea in this basic framework of model representation. However, it is not adequate for representing one's idea only with the object model. An extension of the modeling scheme is introduced afterward.

3.3 Externalization and Exploration

Problem solving is divided into two parts, i.e. externalization and exploration.

3.3.1 Externalization

Externalizing idea precisely is not an easy task for any person because of unclearness of ideas in the human side, as described in A. Bijl; Showing Your Mind, Proc. Fourth European-Japanese Seminar on Information Modelling and Knowledge Bases., 1994. Persons come to vague ideas and cannot express them clearly. Computers can help ones to express their idea to some extent by stimulating them to clarify their ideas. Externalization is an activity to represent human idea/problem explicitly, in the form of model. Conversely, a problem representation is obtained through externalization. An idea/problem created in the person's brain may have various aspects and different methods are used to define them. These aspects are combined to define a complete model in a canonical form (kernel model) by the use of knowledge that has been prepared by externalization methods.

Figure 4:
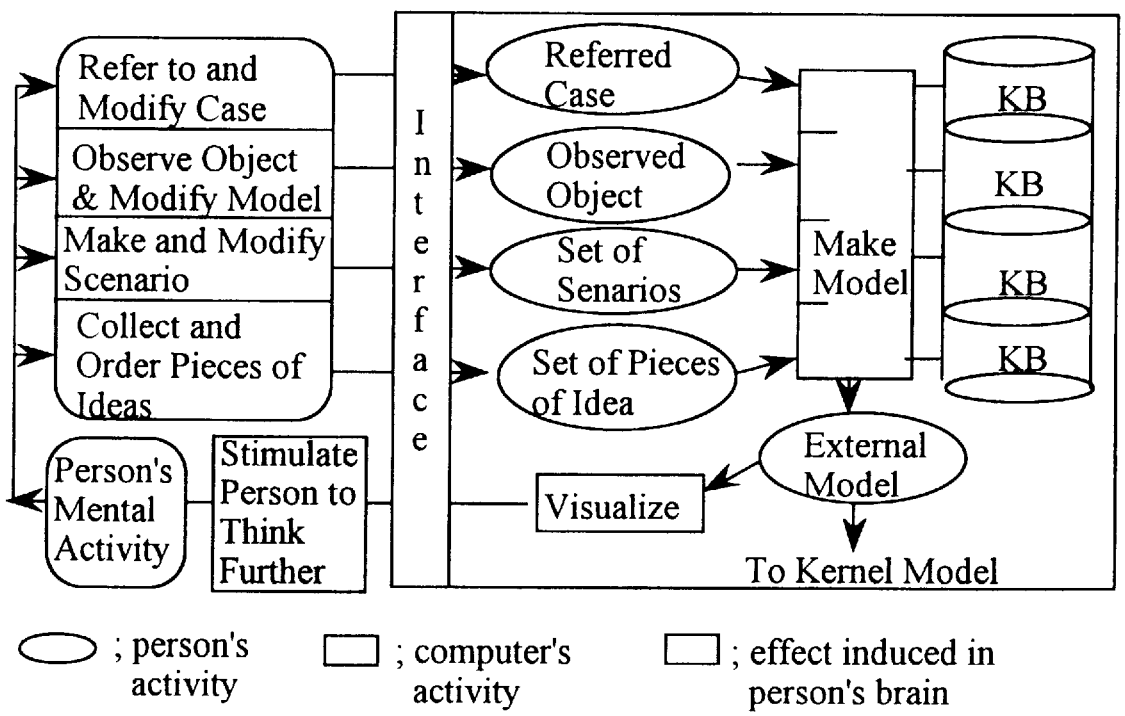
FIG. 4 illustrate some possible ways of making an object model by externalization.

In FIG. 4 there are some (but not all) possible ways of making an object model by externalization, as depending on the cases. Some of them are; (1) using past case, (2) referring to an existing object, (3) prototyping, (4) making a tentative scenario of achieving the given goal with not yet existing object and (5) forming a model from a collection of fragments of idea. (1) is well known as the case-based method. (2) is useful when an object structure is observable. For example, an enterprise model can be made by observing an existing enterprise organization. Requirement specification for a business information system is generated from this model, as described in J. A. Bubenko, Jr., and B. Wangler; Objectives Driven Capture of Business Rules and of Information System Requirements, IEEE Systems Man and Cybernetics '93 Conference. 1993. (3) is well known and is effective if it can be done. (4) is used for starting such an activity as innovative design. For example, in designing a new type of rocket vehicle, its expected missions are first represented in the form of a scenario. This scenario defines afterward an outline of a model representation. (5) aids a person to build up his idea. For example, computer visualizes person s idea by arranging the keywords given by user to represent the fragments of the idea in a multi-dimensional space on the display. Then the users manipulate these keywords so that these are arranged according to their closeness with the idea. As the result the person can note or find something unnoticed before. Hori developed such a system in the above-mentioned reference [HOR94]. Requirement or even the specification for the thing which he/she wishes to do, or, in other words, a problem representation may be made clearer through these processes. These functions form the important parts of human-oriented interfaces. The detail is abbreviated, refer to the above-mentioned reference [HOR94] and Y. Sumi, et. al., Computer Aided Communications by Visualizing Thought Space Structure, Electronics and Communications in Japan, Part 3, Vol. 79. No.10, 11–22 1996. The model thus obtained through externalization is called the kernel model herein.

3.3.2 Exploration by multi-model manipulation

Problems brought in through the externalization phase are solved in the system. It must be able to use various methods established in mathematics, operations research, physics, engineering and so on. Every method or function to implement it must be represented explicitly. Each method is defined based on a specific operational model that represents a specific aspect of object. The operational model is depending on the method. When the system uses a method, it must generate dynamically the operational model for the method from the kernel model. Domain specific or problem specific knowledge must be provided to the systems for generating an operation specific model from the kernel model. Thus not only a kernel model but number of the method oriented operational models are involved in a problem solving.

Figure 5A:
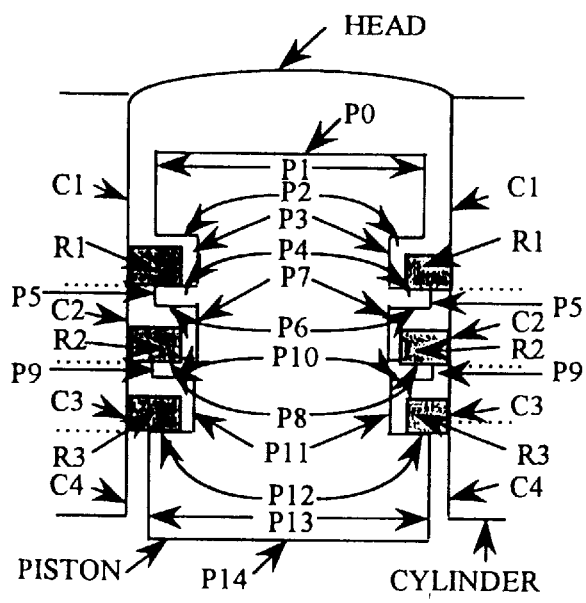
FIG. 5A shows a configuration of an engine according to an example of generating an operational model appeared in a model-based internal combustion engine design.
Figure 5B:
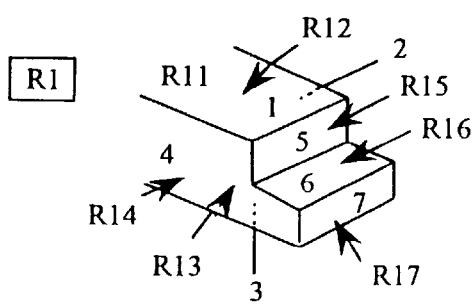
FIG. 5B represents an edge of a piston ring according to the example of FIG. 5A.

FIGS. 5 shows an example of generating an operational model appeared in a model-based internal combustion engine design. The kernel model was the geometric representation of the engine structure as composed of cylinder, piston, piston ring and so on with the related functionality. It was a hierarchical structure as shown in FIG. 5B and described in G. Han, S. Ohsuga and H. Yamauchi; The Application of Knowledge Base Technology To CAD, in Expert Systems in Computer-Aided Design (ed. J. S. Gero).

Figure 5C:
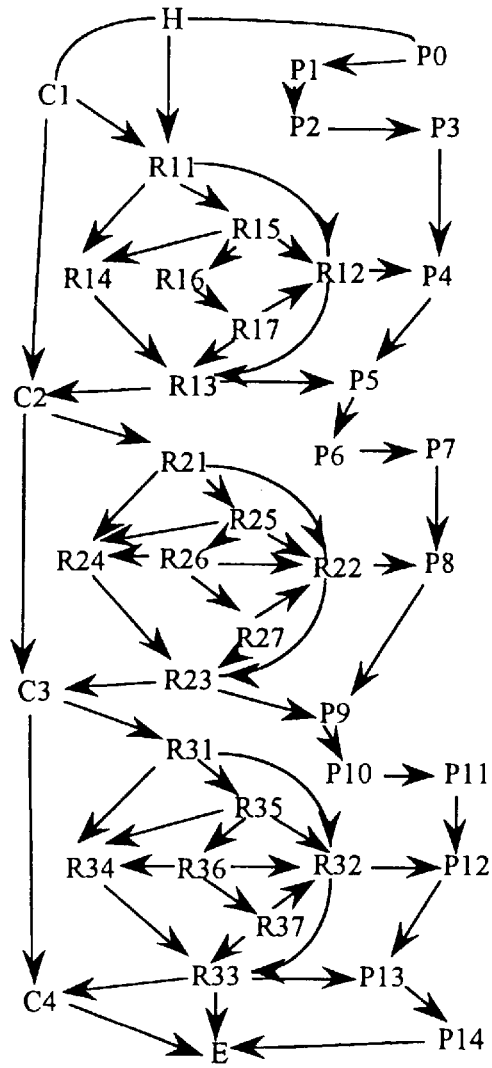
FIG. 5C illustrates a graph generated from the geometric model as an operational model.

The engine had to be analyzed from different points of views. Among them there occurred a problem of estimating the amount of gas leaking out unexpectedly. A graph was generated from the geometric model as an operational model, as shown in FIG. 5C. Every adjacent pair of surfaces composing the geometrical model was created and tested for whether it defines a legal path along which the gas flows. These pairs of surfaces were connected to form a graph including every possible path of gas flow. In reality, the amount of gas was too difficult to estimate. But this experiment gave a valuable view for the method of computerizing the design process.

Figure 6:
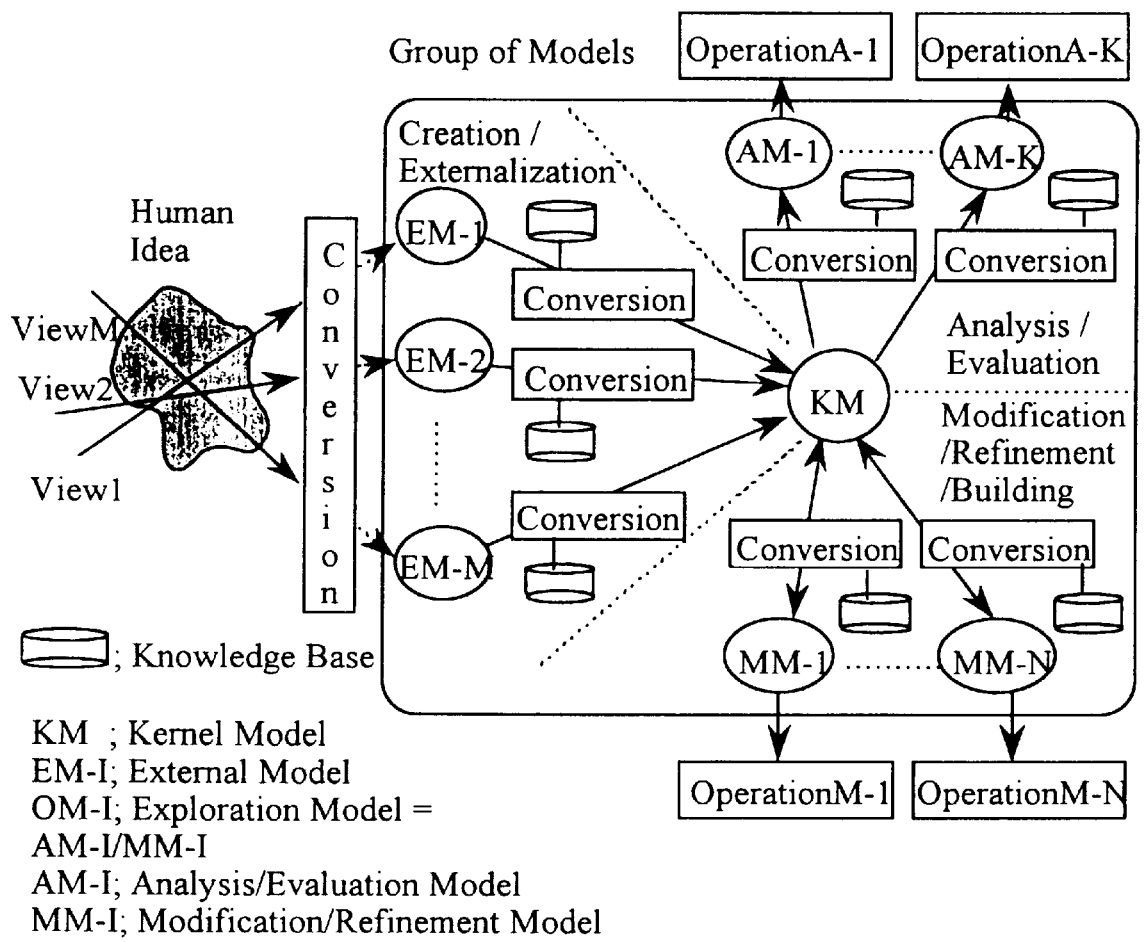
FIG. 6 shows a group of models necessary for knowledge based operations.

It has been also known from some research, such as Toppano, E. Chittaro, L. & Tasso, C.; Dimensions of Abstraction and Approximation in the Multimodeling Approach, Proc.Fourth European-Japanese Seminar on Information Modelling and Knowledge Bases, 1994 that multiple models are necessary for knowledge based operations. Thus the model in FIG. 1 is in reality a group of models, as shown in FIG. 6.

3.4 Meta-Operation for Defining and Controlling Problem Solving

Problem solving of FIG. 1 is composed of operations as; (1) creating an incipient model through externalization phase as a starting point in the solution space, (2) changing the model and (3) analyzing and evaluating the model. The second and third are the operations that manipulate the model and affected by the first operation.

The search space in exploration is vast and, in the usual case, unforeseen. Usually, in fact, only a small portion of the exploration space, i.e. the neighborhood of the current model is explored. Guiding the process that selects the next point (model) as a candidate is very important. Concretely, this means to select a model modification operation. As this operation is an application of knowledge to a model through the inference mechanism, that has to select proper knowledge. This is a meta-level operation to the model manipulating operations. In order to give the system a capability of adapting to the changing environment and also the freedom of adding, deleting or changing knowledge, these meta-operations should also be knowledge-based ones that use meta-knowledge. Thus the concept of meta-level representation is indispensable for developing intelligent systems. This concerns language design strongly.

Different strategies can be used for controlling the process; the choice of knowledge depends on the problem type. It is to select a chunk of object knowledge to apply to an object model so as to change the state of the model.

Figure 7:
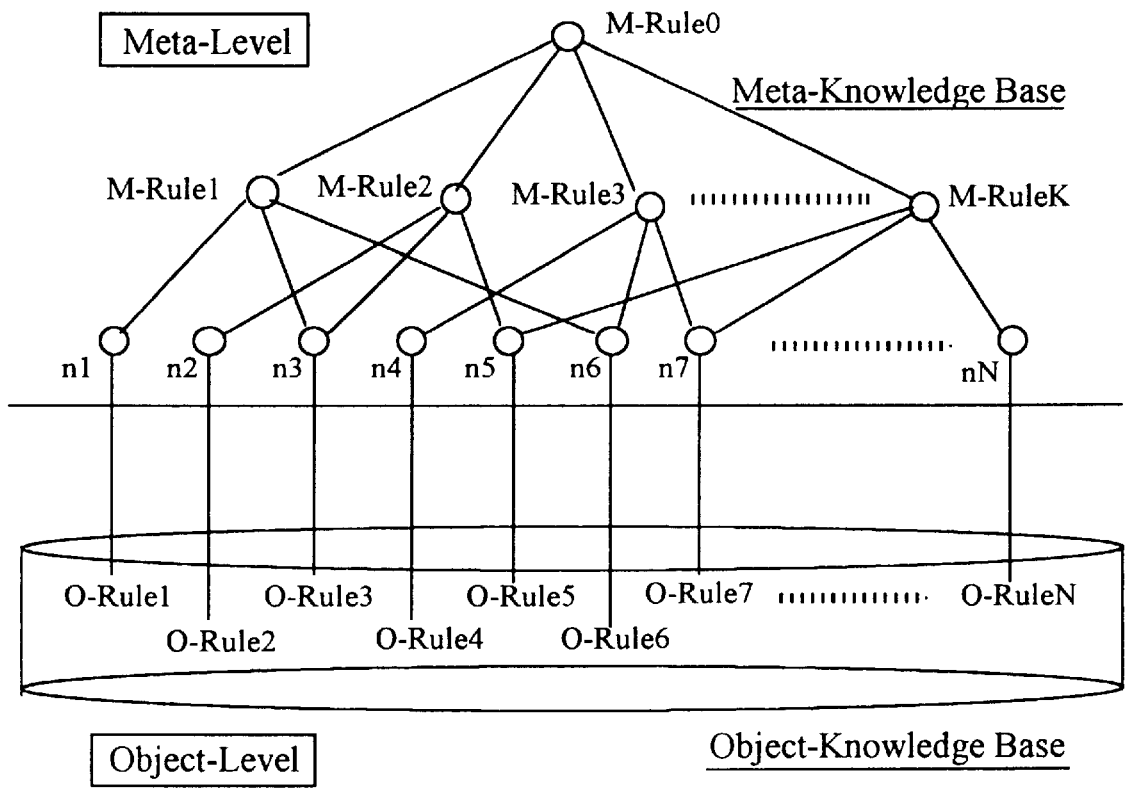
FIG. 7 shows an example of control structure.

The following is an example of making a strategy as realized in a system developed for drug design, which is known from E. Suzuki, T. Akutsu, and S. Ohsuga, Knowledge Based System for Computer-Aided Drug Design, Knowledge Based Systems, Vol.6, No.2, 1993 (hereinafter referred to as [SUZ93]) or the above-mentioned reference [OHS94]. The objective was to find new chemical structures having the specified characteristics by modifying the current model (chemical compounds). Object-level knowledge is given as rules to represent the possible modifications of the existing chemical structure. The knowledge was collected by chemists. These rules described the different effects on the characteristics of chemical compounds and were classified by their effects. For example, some rule modifies an object model to strengthen poisonous properties while the others weaken. These are classified into different classes and to each class is given a description of the effects on the model. This description is given as meta-knowledge. This forms a control model which is represented as a compound of structures, composed of the classes of object-level rules and a set of predicates in the meta-level representing the effects of the classes of the object-level rules. This has the same form as an object model. On the other hand, the selection system selects one group of the object-level rules at a time referring to the current state of model and the goal state. Meta-knowledge can also be used here. These meta-rules are acquired from either chemical theories or the accumulation of rules of thumb. An example of control structure is shown in FIG. 7.

If the meta-knowledge selects only a best modification rule, problem solving proceeds automatically. If more than one rules are selected for modification, more than one models are created as new candidates. One is selected among them either by means of the different strategies in the system or by person by interaction.

There can be a necessity for changing the strategy itself. In order to allow more than one different meta-level operations, meta-meta-level system becomes necessary. For example, person may wish to switch the control strategy from one to another. The different ways of classifying the object-knowledge may be prepared as different control models. Thus an architecture with more than one representation levels becomes necessary. The necessary number of levels is dependent on the problem and on the user's requirements. System must be able to define an arbitrary number of representation levels and also multiple meta-level operations to meet user's requirement.

One may think that this makes the system very complex. It is not true. Representations and operations in all levels are the same. For example, the scheme for representing object-model and control model is the same and, accordingly, the necessary set of operations is the same. What should be added to the system for enabling this multiple-meta level operation is no more than a management system which watches the level in which an operation is performed and executes a special short program when an operation needs to move between the different levels. This management system is named the level manager.

3.5 Intelligent Function Structure

As has been discussed, the different knowledge chunks define different operations under the same inference mechanism. This means that a problem solving system is realized as composed of a processing mechanism and a structured knowledge base. A knowledge base is classified into the different chunks such as for analyzing a model, modifying a model, and so on. The structure of these knowledge chunks is built and the strategic operation in the meta-level assign different chunks to the inference engine for different problems. When this assignment is achieved in a certain chronological order, a sequence of operations is defined. This meta-level operation is also knowledge-based. Thus the exploration based problem solving scheme of FIG. 1 is the first step toward developing GPPSS and it is represented as a composite of the more primitive functions such as for modeling, for model analysis and for model manipulation.

This method is powerful but still inadequate to solve a variety of real problems alone. It is available only when the scale of problems is rather small. The real problems are very often so complex that this simple method cannot do all but still another method that makes the original problems solvable by decomposition is necessary. This must be to decompose a large scale problem into a set of smaller and less complex ones such that the above method can be used.

Decomposition is performed basically on the object structure. It is divided into sub-structures with the least interactions to each other, concerning not only the structural relations but functional relations as well, i.e., with the least interactions among functionalities and corresponding formulas. Each sub-structure forms a sub-problem. In spite of this effort, dividing a problem into completely independent sub-problems is not possible in general. The sub-problems must be solved cooperatively taking the mutual relations into account.

For some problem types such as design, an object structure may not be known beforehand, nevertheless the problem must be decomposed. In this case the only information available for decomposition is the requirement. This time the decomposition is more difficult. It must be done in such a way that its result in as close as possible to the decomposition that would be done on the basis of object structure which could be obtained as the result of the design.

Figure 8:
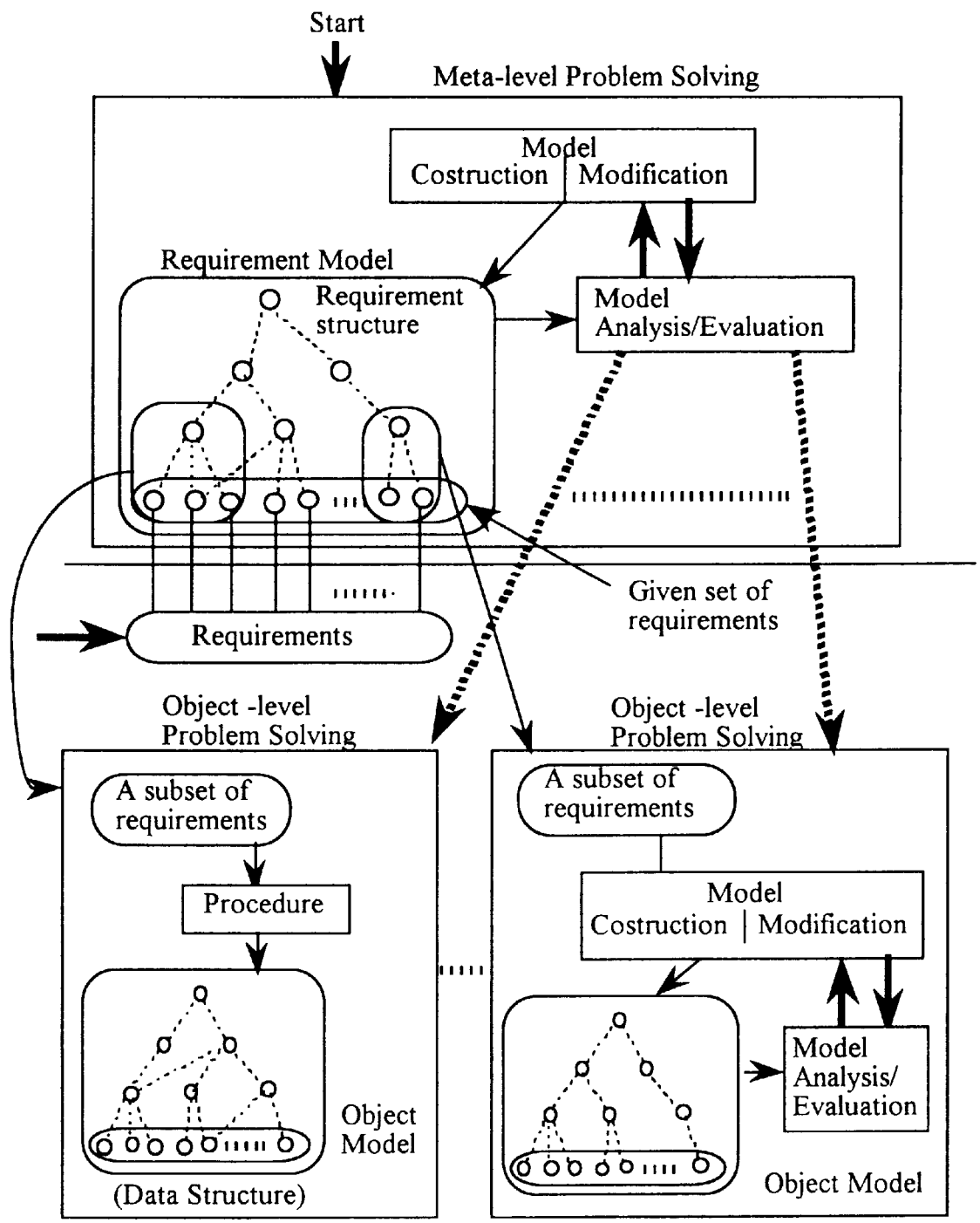
FIG. 8 illustrates a method of decomposition based on the requirement.

Ohsuga showed a way of problem decomposition in the above-mentioned reference [OHS94]. FIG. 8 illustrates the method of decomposition based on the requirement. In this method a large set of requirements defining a large problem is classified into a multitude of smaller ones. Each small set of requirements defines a smaller scale sub-problem. This classification is continued top-down until each new sub-problem is small enough to be processed conveniently by the exploration based problem solving scheme of FIG. 1. Decomposition is to find the best way of classifying the set of requirements so that sub-problems with the least interactions among them are generated and every sub-problem can be solved in the easiest way. It is itself an exploratory problem solving to find such a structure of the requirements. The same exploration based problem solving scheme as shown in FIG. 1 may be used. However, since the components are the requirements in the form of predicates in this case, this exploration based problem solving scheme must be represented in a higher level than the object-level. The scale of this decomposition problem is not so large comparing with the object-level problems that the exploration based problem solving scheme can be applied directly. Thus practical problem solving method is a compound of functions composed of two exploration based problem solving schemes of which one is off-set to the other in this compound structure. Dividing a problem into completely independent sub-problems is not possible again. The cooperative exploratory problem solving becomes necessary.

Real problems are complex and require the compound coherent use of different intelligent functions other than this case. For example, design problem solving needs model creating, learning, model analysis in mathematical or other ways, decomposing a problem into smaller problems, and so on. The different sets of intelligent functions are used for the different objectives such as diagnosing, decision making, planning, automatic programming, etc. It is necessary therefore to study these types of problems, list up the functions required to solve them and provide them to the system. This is an uneasy task but it is an indispensable step for developing intelligent systems.

Figure 9:
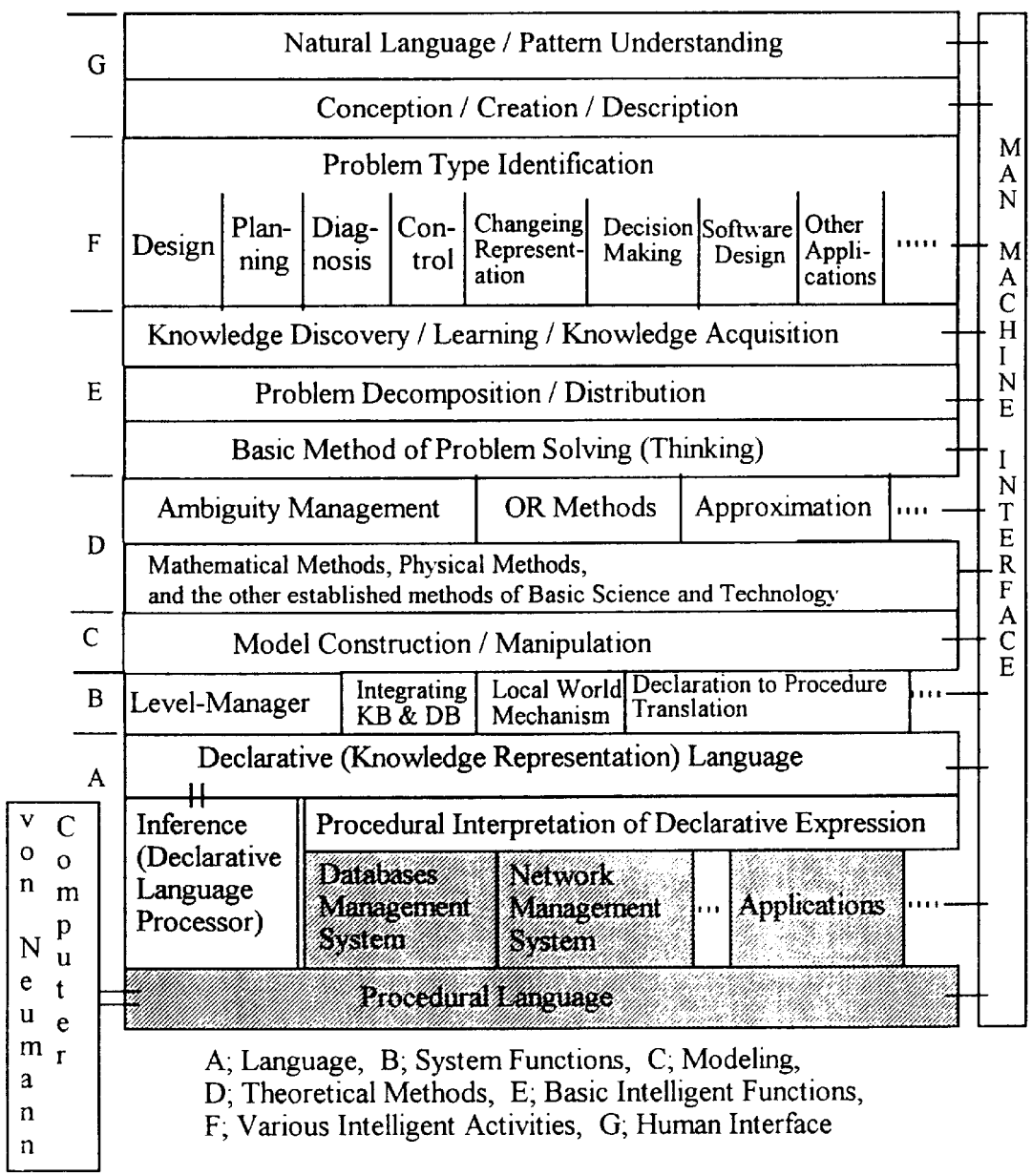
FIG. 9 shows a global function structure formed as a collection of partially structured functions.

There can be a dependency relation among some of these functions, such that a complex activity is defined using simpler ones as it was seen in the decomposition function. If a function F is defined as a compound of other functions $G_i$, (i=1,2,..., n), then let F be in the relation $F > G_i$ and be said greater than $G_i$. In this case the decomposition function is ranked upper to the basic exploration based problem solving scheme. A partial order structure is composed of intelligent functions based on this relation. A global function structure is formed as a collection of all these partially structured functions, as shown in FIG. 9. This issue has been discussed by ohsuga in the above-mentioned reference [OHS95a]. In this global function structure all the functions are arranged in such a way that no function comes lower than the smaller functions and the functions are classified by their roles in problem solving as shown to the left of this figure.

The top two layers in FIG. 9 are for human interface in the broad sense. The functions in these layers are used for aiding human mental activity for externalization. Problems are specified and represented explicitly through these functions. The problems are accepted by the functions below this layer and solved there. Externalization and exploration are separated functionally here. In practice, to-and-fro operations between these two operations are often necessary. Systems must be able to facilitate this process.

Functions needed directly for problem solving belongs to lower layers; they include decomposition, exploration based problem solving, and so on. Different operational models must be generated for dealing with the different aspects of the kernel model. Various theoretical methods which have been established in mathematics, operations research and the others must be fully utilized in problem solving with the related operational models. The functions for manipulating model structure must be at a layer lower than that of the theoretical methods.

Still below this level are the language layers. Declarative language is necessary for representing and using these functions. At the bottom of the structure are the functions which can be represented in the procedural form and therefore can be processed by the current computers. Declarative languages are positioned higher than the procedural language layer because their language processors (inference) are realized by a procedural language. Hence finally the functions in the upper layer are expanded to a set of procedures at the bottom layer via the declarative language expressions that will be processed by the inference engine. Some predicates have the corresponding procedures behind it. These are directly translated to the procedures. For the other declarative expressions a special method is necessary for translating them into procedural programs. This is automatic programming, a special type of exploratory problem solving. This is further discussed in Section 5.

The term 'layer' is used here to discriminate the functions in the dependency relation as discussed above. It is different from the term level which is reserved for representing description levels such as object-level, meta-level etc.

Making this layered structure is similar to making curriculum in a school. They start from understanding the easy subjects then proceed to the more complex issues represented on the basis of the easy functions. This is a way students can glow and acquire such high level capabilities as to solve complex problems. Computer systems which can be compared with human being should also have the similar structure.

3.6 Knowledge Base Structure to Represent Function Structure

Figure 10:
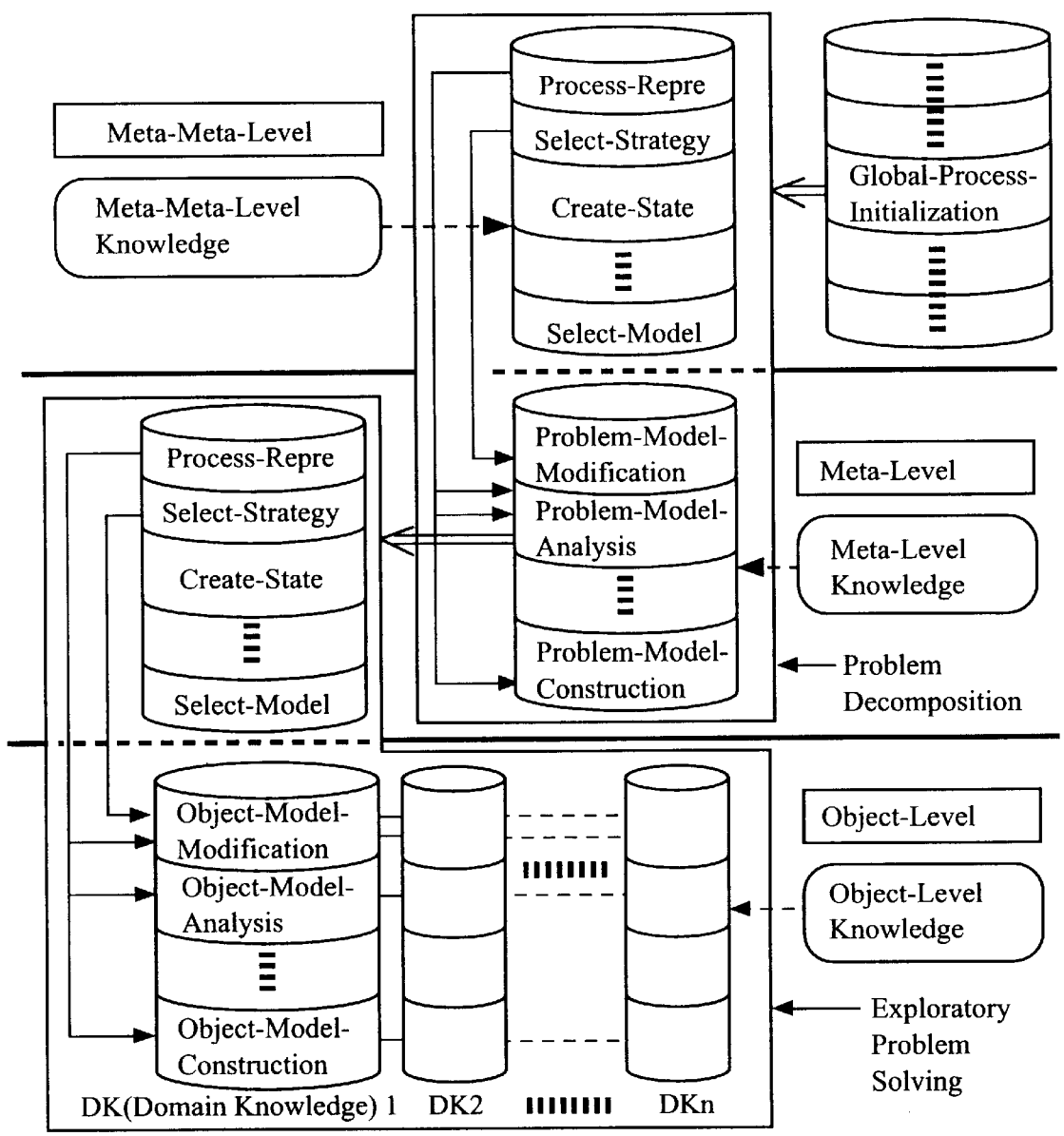
FIG. 10 shows a knowledge structure to partially represent a function structure.

Every function is realized by applying specifically defined knowledge chunks to the universal inference engine. That is, a single knowledge chunk corresponds to each primitive function in the function structure while a complex function is represented by a collection of knowledge chunks which are structured according to the relations between functions. For example, the problem solving scheme of FIG. 1 is represented as a static structure of knowledge chunks as shown in FIG. 10. This knowledge structure spans different representation levels; the object level in which knowledge chunks for dealing with object model directly are located and meta-level in which those for dealing with object knowledge for controlling the problem solving process are located. Similarly, a knowledge structure for representing decomposition is shown in FIG. 10. A knowledge structure to represent the decomposition based problem solving scheme therefore is a compound of a pair of knowledge structures to represent a simple exploration based problem solving scheme of which one is off-set in the representation level. Thus the structure spans over three representation levels. By combining this static knowledge structure with the universal inference mechanism, a decomposition based problem solving can be achieved. The collection of these partial structures forms a global structure of knowledge chunks to represent the global function structure. This is the global knowledge base.

Not all functions in the global function structure are tightly related as was the case of the decomposition and simple exploratory problem solving above but some functions are defined independent from the others. The global knowledge base is a collection of these single knowledge chunks or their sub-structures. If this global knowledge structure has been provided, a sub-structure for representing a specific function is selected therefrom by a strategic and control operation.

In order for solving a problem a specific set of knowledge chunks is necessary. This set is inherent to the problem. When a problem is given, a proper set of knowledge chunks to the problem must be identified. When a set of knowledge chunks are selected successively, an operation sequence is defined. This set of knowledge chunks together with the processing mechanism defines a problem specific problem solving system.

Some sub-structure of knowledge chunks to represent a function spans over multiple levels, as was seen in decomposition. When such a structure of knowledge chunks is used in problem solving, level management is indispensable because uncontrolled move of operation and data across the levels can cause unexpected, contradictory results. But level management is necessary only within a structured chunks. When the control moves to the other knowledge chunks independent of this structure the level concept in the former structure is no more significant. Namely, not an absolute level but only the relative level is important. When two or more sub-structures of knowledge chunks are combined to form a larger structure for meeting the requirements to given problems, a new global level system must be defined by integrating the local level systems in the different sub-structures into a new structure.

The function structure as shown in FIG. 9 can be represented by a structure of separate knowledge sources arranged in different levels as shown in FIG. 10.

3.7 Processing Mechanism

A processing mechanism for exploratory operations is composed of an inference engine, knowledge memory and level-manager. The level manager switches the operations across the boundaries of levels.

Some parts of this ideas have already been implemented by the inventor's group and applied to various problems. The system named KAUS (Knowledge Acquisition and Utilization System), which has been developed for the purpose, is described in the above-mentioned reference [YAM93].

3.8 Structure of Cooperative Problem Solving

Cooperative problem solving starts when somebody creates a problem in one's brain. This problem must be represented in whatever way the computer can accept and transmitted to computer systems. This externalization phase is common to all problem solving. The computer represents the problem in the form of model and identify the type of the problem. The succeeding process is different by problems and to each problem a specific process must be generated. The process is represented as composed of intelligent functions and structured by the knowledge chunks that represent these intelligent functions. The relevant chunks must be identified, retrieved from the global knowledge structure, and a specific structure is formed. All these operations are achieved according to the problem representation. The combination of this structure of knowledge chunks and the processing mechanism define a special purpose problem solving system dedicated to the problem. This has the same architecture as the general purpose system supplied with a knowledge base representing a global function structure and behaves in the same way as the general purpose system. What is important in this process is to identify the given problem, to get information to select the necessary set of knowledge chunks and the way of organizing them into a problem specific structure. A special method is necessary to represent problems for this purpose such that the necessary information can be obtained therefrom. This is discussed in Section 4.

4. MULTI-STRATA MODEL TO MAKE COMPUTERS COMPARED TO PERSON

There are different types of problems such as design type, diagnostic type, planning type, and so on. Each one requires a specific problem solving method which is represented by a specific structure of intelligent functions in the global function structure. This is a problem oriented structure of functions. Let it be called a problem-specific function structure. This structure represents the specific way of using functions to solve the given type of problems. Since the structure is problem dependent, a key to generate this structure must be created at the phase of incipient model building.

An object model defined in section 3.2 does not include such information. The object modeling scheme is defined there as a description method of objects which can be dealt with by some subject, i.e., a person, a group of persons or a computer program. Building only an object model therefore does not initiate any problem solving. There must be given some subject who intends to use the object model. Thus an incipient modeling scheme should not be merely a way of describing an object but must be able to represent the more complex model involving more information: first of all, the subject should be modeled too.

Figure 11:
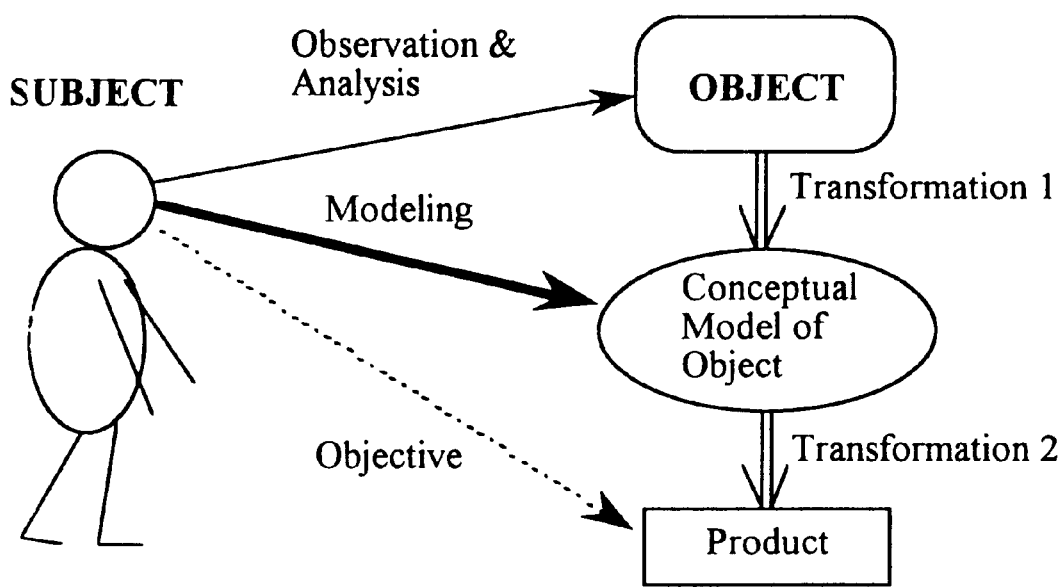
FIG. 11 shows a schematic diagram of a conceptual modeling according to the present invention.

Why people could do only by defining object model so far? It is because problem solving has been considered in such a limited scheme that person deals with an object directly without exception. This condition has been met when problems to be solved were small and persons could do everything. But cases are increasing to which this condition cannot be met anymore. A typical example is programming. A program generates a solution (output) to the given problem (input). That is, a program is itself an automatic problem solver replacing someone who has been working with his/her task. Hence programming is a problem of creating an automatic problem solver. Automatic programming system is therefore such a computer that behaves as the subjects to solve problems of programming. It has this person dealing with the task as an object. This is shown in FIG. 11. Therefore an extended modeling scheme including human activity becomes necessary.

4.1 Multi-Strata Structure of Object

Modeling scheme is extended in such a way that a model is defined in the context of a relation between subject and object. The subject has an intention to solve a problem which arises with respect to an object. The subject can be either a person or a computer and the object is anything in which the subject has an interest. There can be the different combinations of subjects and objects and different object models are to be created for each combination, as shown in FIG. 11.

Everything in the world can be an object of human thinking. It can be a physical object or an abstract concept. It can even be a problem solving process by others. An object has many aspects (characteristics), but only some of them, in which the person has interest, are included in a model. Hence, different models may be created depending on personal interests even if the object is the same. In the same way, the subject can be other than a person. We have an interest in particular in the case where the subject can be replaced by a computer.

There must be a new modeling scheme to represent and generate solutions for these cases. When the subject is a person, the model is created in the human brain. People are not always conscious of the method of building this model by themselves. However, when the subject is a computer, a method of building a model must be represented explicitly and is given to it in advance. It is necessary therefore to study the human way of building a model. This study is itself another problem composed of a subject and an object in which the object is a human mental activity of a person (S1) building a model and the subject is the other person (S2) who studies the activity. In this scheme problem solving involves another problem solving, thus forming a nested structure in which the inside process is for obtaining a solution directly on the lowest level object, and the outside process is for obtaining a way of obtaining the solution in the inside process.

Figure 12:
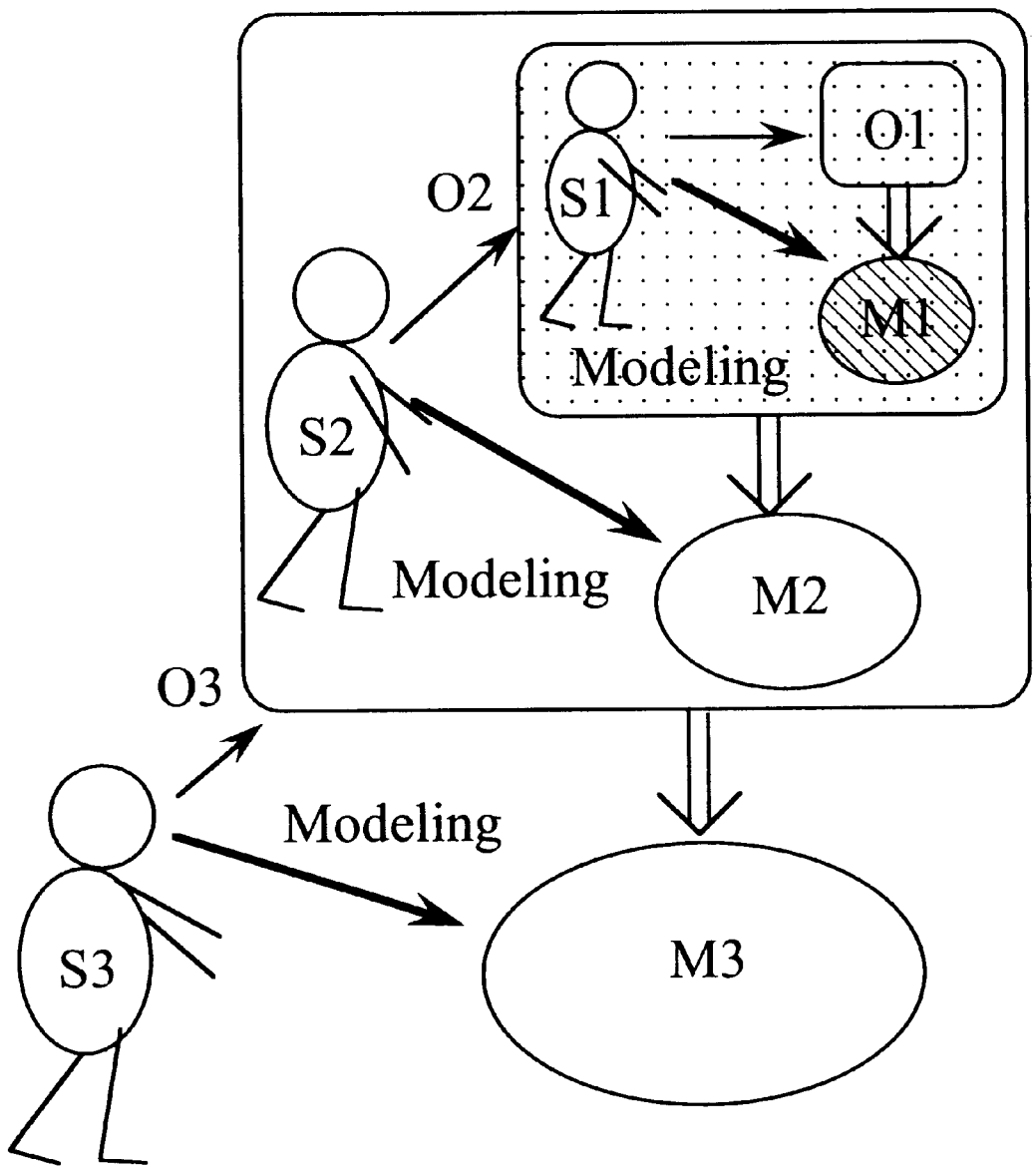
FIG. 12 shows a schematic diagram of a multi-strata object according to the present invention.

Studying human activity is not easy, but once the model building activity has been clarified, its implementation on computers becomes possible. Thus this double process represents a process of computerizing problem solving, as shown in FIG. 12. Let it be called a multi-strata object.

Sometimes an object with a higher number of strata must be considered. The inventor discussed it in the above-mentioned reference [OHS96] referring to the case of intelligent tutoring system design. Another example of many strata modeling is seen in designing modeling big enterprises. There is a conventional method of representing the enterprise organization by a simple boss/clerk relation. If, however, the enterprise is to be restructured and the person at a higher level strata has a role of evaluating the activities of persons at the lower level, then the conventional method is inadequate. There can be still the other persons in the higher level strata in this enterprise and so on.

A new modeling scheme is necessary to represent such multi-strata objects. The model must be able to encompass a variety of multi-strata objects that arise as depending on the situation and characteristics of the constituents in context. If a taxonomy of modeling that covers all different situations can be defined, then it is possible to design intelligent information processing systems that can accept diverse problems with different characteristics. This method resolves some difficulties involved in ordinary information processing. For example, it will help us to formalize software design. To discuss such a modeling scheme therefore is to discuss the basis of information processing. To realize it means that a general purpose information processing system, completely different from the ordinary computer systems, is realizable.

It is possible however to assume always the existence of a still outer stratum for every existing problem solving process or system. Accordingly, in principle, an infinite strata scheme may be assumed that results in an infinite taxonomy of problem solving. Practically this is not viable. In practice, the number of strata is limited and almost all problems can be represented by models of a certain finite number of strata because the effect of an inner process to the outer processes reduces rapidly and it is of no practical use to take too many strata into account. On the other hand, sometimes the number of strata which a person can take into consideration is less than what is really necessary because human capability of dealing with very complex problems is limited. Intelligent system being discussed here can help the person by offering a method of representing an object with the necessary number of strata. The depth of the multi-strata object which must be taken into account is represented explicitly in the model. In this way, diverse human mental activities can be formalized and represented.

4.2 Multi-Strata Modeling Scheme

Figure 13:
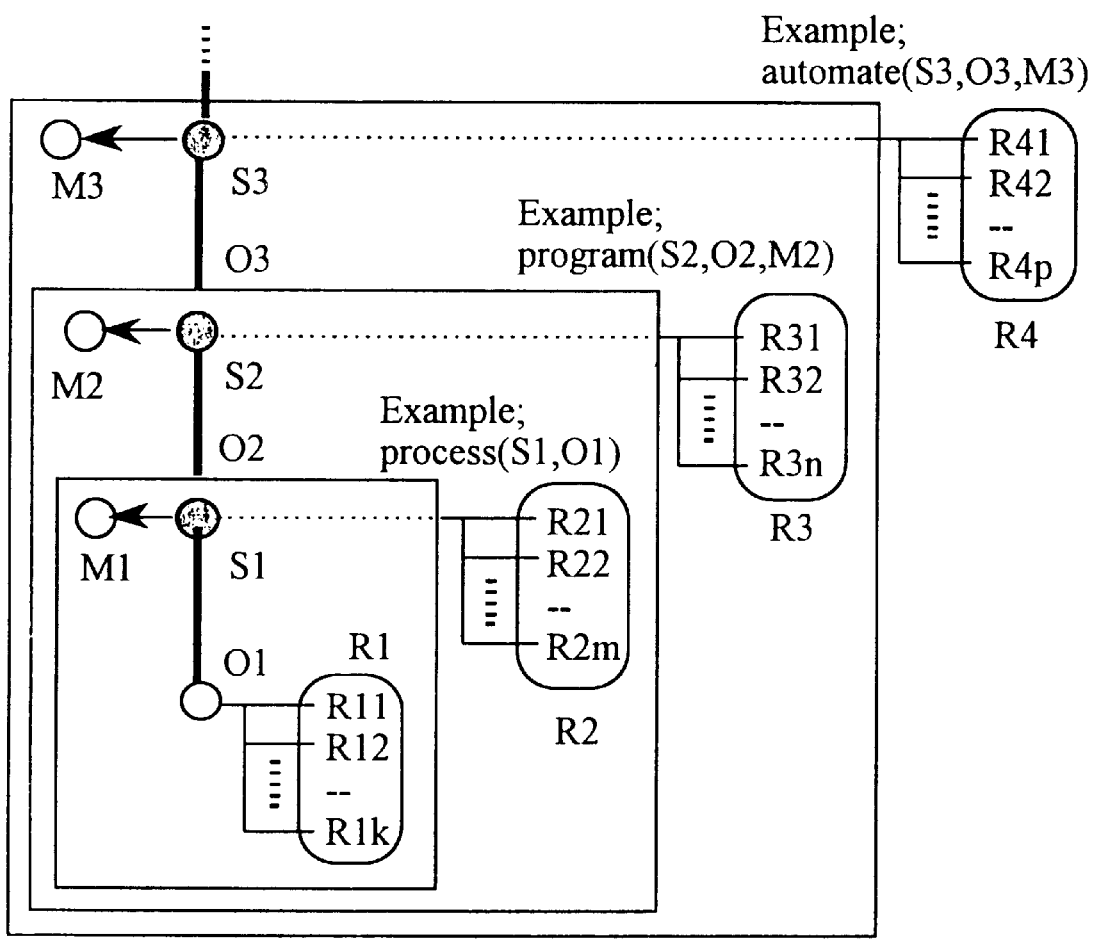
FIG. 13 shows a scheme including a subject node for modeling multi-strata object.

A multi-strata model is a formal model of a multi-strata object. It is made whenever an outside process is considered to an existing problem solving. It means to model the human activity when the subject of the inside process is a person. A scheme including a subject node for modeling multi-strata object is shown by an example in FIG. 13. In a multi-strata object shown in FIG. 12, a base level problem arises from some lowest level object (O1). Requirements given to O1 define a problem in this level. In the ordinary problem solving, a person (S1) makes its model (M1). This is the basic model as was discussed in 3.2. In the next level this problem solving itself is an object (O2) and another subject (S2) has a problem of making its model. The requirement given to S1 defines the task the person should do. For example, it may be a command given to S1 such as "design an object to satisfy the given object-level requirements", "check the legality of the object-level requirements" and so on. These specify the activities of S1 which are formalized in the next stratum and are considered as the requirement to define the model M2 of O2. Similarly some command is given to S2 to specify the task the S2 should do. For example, "automate the activity of lower stratum subject" is given. If there is still an outer process, then this command becomes the requirement to define the model of the higher stratum object. These stratified requirements define a multi-strata object and are used to make a multi-strata model. The upper stratum requirement includes very often the lower stratum requirement. In order to represent it, a higher (meta) level representation scheme is necessary.

Even if the object is the same the way of problem solving is different depending on the requirements given to the subjects in a multi-strata model. With the ordinary way of describing only the lowest object model, the correct problem representation is only in the brain of the person and the computer cannot know it. For example, the problems are completely different even with the same enterprise model considering the requirements given to the higher stratum subject. The requirement may be to restructure the whole enterprise or to automate the activities of some persons working in a lower stratum. Without the problem being represented explicitly the computer cannot discriminate between these requirements and cannot be an autonomous system. It can only take part in the problem solving by a person by undertaking part of the tasks around the lowest level object model. Contrarily, the multi-strata method expands considerably the scope in which computers can work. Among a number of different problems in this scope, attention has to be paid to designing automatic systems. It is formalized as a process of making a multi-strata model and then generating a system to replace persons as subjects in the lower strata. This leads us to idea of automatic programming.

4.3 System Generation Based on Multi-Strata Model

Figure 14:
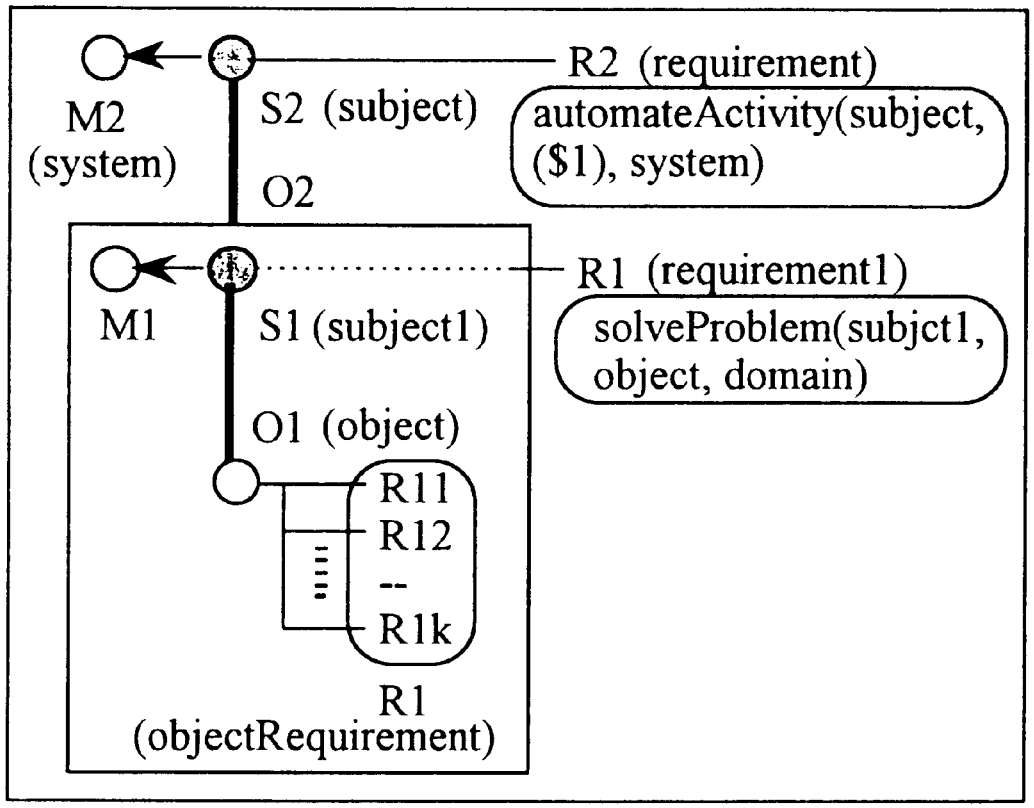
FIG. 14 illustrates an example of a simple multi-strata model.

Problem solving including a multi-strata object begins with making a multi-strata model that represents the object as shown in FIG. 14. Then the requirements distributed in this model are processed from the highest stratum. The requirement is interpreted and processed. For the purpose a specific operation to deal with the requirement is activated. Here the problem is of deciding what operations are necessary. To define an operation is to define a knowledge chunk in an intelligent system as it has been discussed before and this is to retrieve a sub-structure of knowledge chunks from the global knowledge base to define the necessary operations for processing the requirement. This retrieval must be done as based on the given requirement. This sub-structure together with the processing mechanism define a knowledge based system dedicated to the problem. For example, let a requirement "automate the activity of lower stratum subject" be given to a highest level subject in the simple multi-strata model as shown in FIG. 14. Let it be represented as the internal form like automateActivity (subject, ($1), system) where subject, ($1), and system denote the subject to which this requirement is given, the lower stratum subject to this subject, and a system to be generated in order to replace the lower stratum subject, respectively. () represents the object (O2 in FIG. 14) of the given subject (S2) in the multi-strata model. This is a special symbol reserved for using multi-strata model. It is composed of a pair of the lower-stratum subject and its object. $1 in () refers to the first item of the pair, i.e. (lower stratum) subject in the object (O2). The objective is to retrieve the sub-structure of knowledge chunks to define a system to replace the lower stratum subject.

Knowledge is necessary to interpret this requirement and to resolve it into a set of operations. Let the requirement given to the subject S1 be a design problem. A set of requirements which should be satisfied by an object O1 is given but the object structure is not known. The role of S1 is to find such an object model that satisfies these requirements (see FIG. 14). In this case the requirement given to S2 is satisfied by generating a system which can do every operation which has to be done by S1. As has been discussed in Section 2 of the description of the preferred embodiments, a general scheme of solving this problem is the one as shown in FIG. 1. Therefore the requirement given to S2 can be satisfied by retrieving a knowledge structure to represent this scheme. The following rule can be used to fulfill the requirement.

automateActivity (subject, ($1), system):
    identifysubject (subject, ($1), subject1) . . . *1
    getSubjectRequirement(subject1, requirement1) . . . *2
    generatesystem (subject, requirement1, system) . . . *3
    evokeSubject (subject, requirement1, system) . . . *4

This is a general rule and the terms in Italic represent variables that are universally quantified unless especially commented and are be bound at unification. In the case of model of FIG. 14, subject and subject1 corresponds to S2 and S1, respectively. system denotes a system to be generated. requirement1 is the requirement of subject1 (S1). This rule says that a system which replaces the lower stratum subject1 is obtained by taking out the lower stratum subject (*1), taking out the requirement given to the lower stratum subject (*2), and generating a system to satisfy the requirement (*3). This operation (*3) is defined by another rule as is shown below. After the requirement1 is substituted by the requirement to S1 in the multi-strata model, the predicate generatesystem is evaluated. Since the system to be generated is different for various problem types, different rules must be provided for generating the system, as corresponding to possible types. In case of the above example, this is the type of problem given to S1, i.e. solveProblem(subject, object, domain) to which a rule is prepared as shown below. It is assumed that the name of problem domain is included in the requirement. Finally the system thus generated replaces the subject1. S2 evokes the system to replace S1 for operation and gives it the requirement (*4). An example is shown in 5.2.

generateSystem (subject, solveProblem(subject1, object, domain), system):
    identifyObject (subject, subject1, object) . . . *1
    getObjectRequirement (subject, object, objectRequirement) . . . *2
    problemType (subject, solveProblem(subject1, object, domain), type) . . . *3
    identifyDomain (subject, solveProblem(subject1, object, domain), domain) . . . *4
    retrieveKnowledge (subject, type, domain, knowledgeChunk) . . . *5 makeSystem (subject, system, knowledgeChunk) . . .
*6

This is also a general rule for the case when the requirement to subject1 is represented quite generally such as 'solve a problem'. subject1, object, are substituted again by S1 and O1 respectively. The type of problem must be identified from the representation of the requirement on object. If it is represented in the form of functionality(object, value), there are three different types depending on which of functionality, object, and value is unknown. In the case of the object being unknown this is a synthetic type problem like a design problem. The requirement to S1 may be given more specifically such as design, diagnosis, control, programming etc. In these cases the problem type is included explicitly in the requirement. Different rules are needed in order to obtain solutions for different problem types.

In the above rule the predicate (*1) can be redundant when object is included in the requirement given to the lower stratum subject. But since this is not always the case, an operation for its identification is necessary. The problem type is obtained by the predicate (*3). The problem type decides the knowledge chunk that defines the problem solving scheme for this problem. The domain to which the problem belongs is obtained at (*4). This is necessary to select the domain specific knowledge chunks for analyzing and modifying the object model at the object-level (ref. FIG. 1). For other types of problems than this other rules must be provided. Then the necessary knowledge chunks are retrieved by (*5).

The predicate (*6) arranges these knowledge chunks in the basic framework of defining a system and makes links to each other and also with the other part of the system such as human interface. Thus a problem specific problem solving system can be generated and substituted into system. This system is a knowledge based system to solve the problem by exploration. The knowledge chunks can be retrieved by the following rule.

retrieveKnowledge (subject, design, domain, knowledgeChunk):
getTaskKnowledge (subject, design, taskKnowledge) . . . *1
getDomainKnowledge (subject, domain, domainKnowledge) . . . *2
integrateKnowledge (subject, knowledgeChunk, taskKnowledge, domainKnowledge) . . . *3

The first predicate takes out the knowledge to define design task from the global knowledge base. Since the design scheme is common to many domains, this task knowledge includes knowledge chunks that relate to different domains. The second predicate selects only those which are necessary for solving the given problem. Finally, these knowledge chunks are integrated to form the knowledge chunks as required for the given domain.

4.4 Some Examples of Multi-Strata Model

A few examples which need multi-strata modeling are presented.

[1] Education system

The multi-strata scheme is necessary for representing the relation between students and teacher in education. A student intends to solve a problem given by the teacher, for example, on a natural phenomena in a course of natural science. In this problem solving, the subject is a student and the object is a natural phenomenon. The teacher has another problem. It is to find the best method for guiding the student so that they find the solutions themselves instead of the solutions being given by the teacher. The teacher gives each of them a sequence of problems as subgoals to reach the final goal, i.e., complete understanding of the natural phenomena. The students try to reach the subgoals by making models which can meet the teacher's conditions. The object in the teacher's problem solving is the student's mental activity.

Moreover, if some third person intends to replace the teacher by an intelligent tutoring system, there emerges an outer problem solving process in which this person is a subject and the teacher is the object. Thus in this case a three strata structure is formed. The requirement to this third person is again to "automate activity" and the same rule is used as discussed in the last section. The requirement to the subject S2 is "teach student on X" in which X is an object to be taught. It is represented teachstudent(subject1, ($1), teachobject, domain) formally in which ($1) represents this time the student, the teachobject is substituted by an object which the teacher intends to teach and domain is the domain in which this teaching-object belongs, in this case natural science. Then the requirement in the predicate generatesystem(subject, requirement, system) included in the automateActivity is substituted by teachstudent (subject1, ($1), teachobject, domain) to generate generatesystem(subject, teachstudent(subject1, ($1), teachobject, domain), system).

The rule for expanding this requirement must be made. It must be very different from that for solveProblem as was shown above. Different from solveProblem having a single object, teachStudent has two objects; students having their own objects and the things to be taught. The latter can be anything. It can be such an object including human being as the first object was. This makes the modeling of the teaching very complex.

Furthermore, since teacher cannot look into student's mind directly, he/she has to make a model of the student in his/her mind based on the answers of the student to the given problems, as described in H. U. Hoppe, Deductive Error Diagnosis and Inductive Error Generation for Intelligent Tutoring Systems, Journal of Artificial Intelligence, Vol. 5, No. 1, 27–49, 1994 or J. Self, Model-Based Cognitive Diagnosis, Journal of User Modeling and User Adaptive Interaction, Vol. 3, 89–106, 1993.

Today, no model-based method of teaching nor the method of building student model is established. The personal way of teaching and its model must be made first to define teachStudent. Then a method of executing generate-System must be made.

[2] Enterprise model and enterprise design

Figure 15:
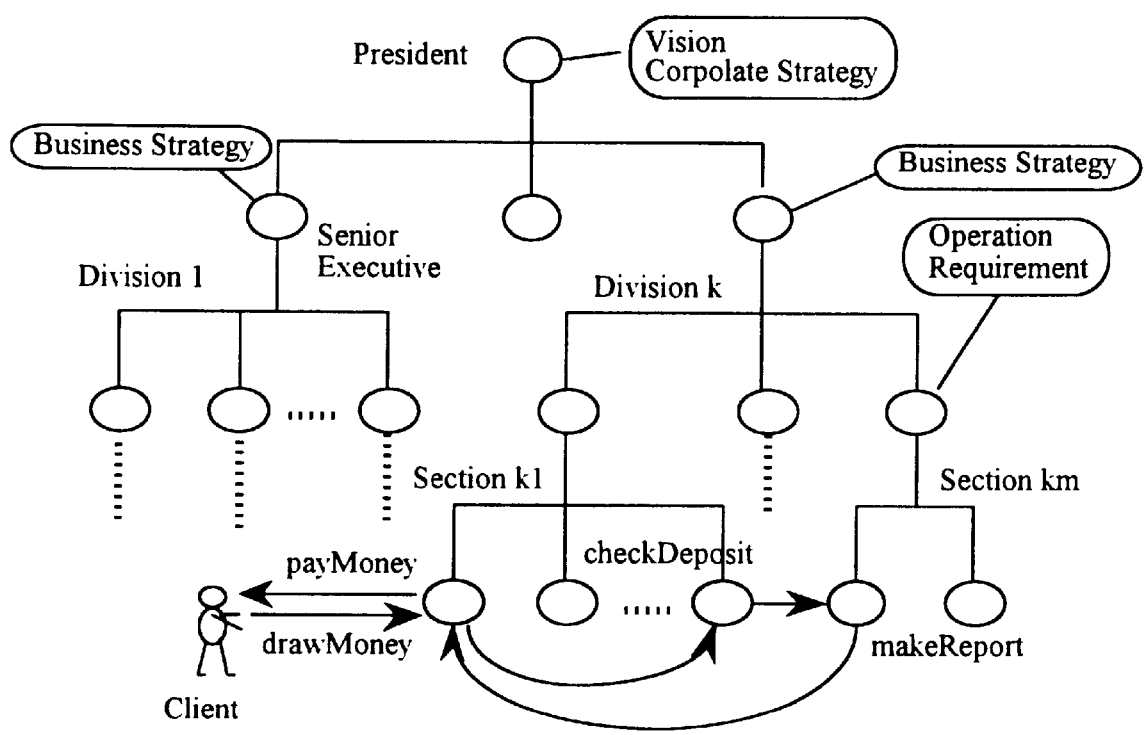
FIG. 15 illustrates an enterprise model.

Enterprises are becoming the objects of scientific/technological consideration. An enterprise is composed of many persons and, in most cases, they are organized to form a hierarchical structure. Each person is assigned a specific role depending on the position in this structure. A person at the highest level, say a president, has the role to make a vision of the enterprise as a whole. This is either given from the beginning (made by a founder of the enterprise) or made by the president. To make a corporate strategy may also be his/her role. These are the highest level requirements given to this model. To make business strategy may be the role of senior executive at the next level. On the other hand, the actual operation tasks are assigned to the persons at the lower levels, as shown in FIG. 15 which illustrates an enterprise model. These tasks are represented as functionalities and relations among them define the activities of the enterprise. Let us assume, as an example, a case of bank. In an old style bank system, for example, a teller at the counter (a subject) cooperates (is related with) the other persons (subjects) for an operation to respond to the request by a client to draw money by the following rule, drawMoney (subjTeller, clientName, date, time, accountNumber, drawAmount):
  checkDeposit (subjTeller, subjDB, clientId, date, time, accountNo, drawAmount), . . . *1
  payMoney (subjTeller, clientName, drawAmount), . . . *2
    sendReport (subjTeller, subjReport, date, time, clientName, accountNumber, drawAmount). . . . *3

This is made only for the purpose of explanation and is very much simplified. subjteller, subjDB and subjReport denote the subjects having the roles of telling at the counter desk, operating database and accumulating information in order to make a report. This relation and further ones including checkDeposit and sendReport define the activities of the bank. Usually this kind of rule has been made and exist in every bank to define the activities of banks.

Nowadays, some special machines are introduced in the enterprise. For example, cash dispensers are used in many banks as the important constituents of the enterprise. These machines accept various user's requests such as money drawing by cash card, money depositing by a bankbook, sending money to an account in another bank, and so on. Each request is represented formally in a similar form as drawMoney as shown above. The machine is a human interface to generate the formal request. To define the enterprise the relations of the functionalities in the model that includes these machines must be provided with.

Even if many persons are included in the enterprise, if these tasks are determined as parts of all task which are necessary to accomplish the objective of the enterprise and are fixed, then the enterprise is modeled by the ordinary object modeling scheme. To make such an enterprise model is important because it clarifies the activity of the enterprise and of the persons working there, and accordingly is used for making the specification of programs to be developed to this enterprise. For example, a job is defined as an information flow (e.g., a transaction) in the structure. Tasks are defined as the way of dealing with this information at the related nodes along this flow. This process is shown explicitly in the model and is visualized (FIG. 15). Activities such as drawMoney shown above can be made in this way. This is an example of Externalization.

If it is judged that this enterprise is not fitting to the changing social environment, then it must be restructured. The proper organization that adapts to the environment has to be found. It is investigated through analysis of its model whether it is well adapted to the environment or not, and if it is judged inappropriate, then it is restructured. This is the process of model building, model evaluation and model modification. This is quite similar to engineering design and is called enterprise design here.

There must be a (or more) designer who deals with the enterprise as a design object. In this case a multi-strata model becomes necessary, in which the designer is a subject and the enterprise is the object. Simulation may be only method to analyze the enterprise to achieve this design. If the functionalities and their relations are represented in detail in the enterprise model and knowledge is provided in the system for finding the required quantities, then the enterprise model as shown above can be used as a simulation model and the simulation is executed.

Such a simulation has been performed for a part of a hypothetical bank organization by Ushijima, as described in M. Ushijima, Ph.D. Thesis in University of Tokyo, 1995. He simulated the behavior of a team of employees who sell and buy money according to the variation of the money price in the market. Different behavioral conditions were given to senior and junior staff in this team. The simulation was performed using real economic data in past and balance sheet was made for 80 units of period.

It is possible to take the different approach for restructuring from this one. In some companies persons at the higher rank are required to evaluate the other persons at the lower rank and this result is used for the purpose of restructuring. This is the additional task different from those which are the parts of the activity to accomplish the objective of the enterprise. In this case, a multi-strata model must be created in which the persons at the higher rank and at the lower rank in the hierarchical organization are located in the different strata in the multi-strata model. Thus a concept of multi-strata model is introduced there.

This kind of restructuring was included in the above experiment by Ushijima. According to the balance sheet obtained, the organization of this team was restructured by the manager by removing/adding some persons from/to this team.

In this experiment the decision rule of removing/adding some member was very simple. It was based only on the average amount of money earned or lost by the team. If it went over (below) the pre-defined upper (lower) level, a member was added (removed). It is possible to make a more sophisticated model in which the manager makes a mental model for each member and judge the member his/her suitability for the job.

[3] Automatic programming

A computer program is an automatic system that generates a solution to a given input and replaces a person who has been taking charge of this task. Programmer makes a program after analyzing the way which this person does his/her task. Automatic programming is therefore to automate the generation of automatic system. This scheme needs being represented by a multi-strata model in which the lowest stratum object O1 is a task which is processed by the person, a subject S1. For example, O1 is a transaction in an office information processing system and S1 is a teller at the counter in a bank. Object-level requirements R1 are made by manager to define tasks performed there. The requirement R2 given to subject S1 may be "to process this task". A programmer is the next stratum subject S2 with a next stratum object O2 composed of S1 and O1. S2 is given a requirement R3 "to make a program for O2". A subject S3 studies the activity of S2 and generates a system to replace it. The requirement R4 to S3 is "automate the activity of S2" again.

Automatic programming is realized in two steps. The first step is to generate a system to satisfy the requirement of producing required output for the given input. This is to generate a problem specific, autonomous problem solving system as discussed in 4.3. With this system the given problem can be solved by exploration in principle. The second step is to convert the exploration based problem solving to a deterministic, procedural form.

The way of automatic programming is different case by case, especially driven by the characteristics of the lowest stratum object and by the tasks allotted to S1. It is discussed in the next section.

5. AUTOMATIC PROGRAMMING

Not all problems can be translated into a procedural program: the possibility of a problem being represented in the procedural form depends on the characteristics of the lowest stratum object.

5.1 Problems Which Can Be Represented in the Procedural Form

Only a special class of problems can be represented by a procedural program. Let us think of the case of office program in an enterprise in which the task of S1 is specified to the detail in relation with object O1, as discussed in the example above. It is possible for system engineers (SE) today to state the task of the workers explicitly before programming by the nature of this problem. In reality this is part of making an enterprise model. It is made in the SE's brain today. If such an enterprise model could be represented explicitly, the object O2 is made clearer and it is no more necessary for the SE or programmer to analyze O2 himself/herself.

This type of problems require no change to the model during problem solving, neither with respect to the object structure (enterprise organization) nor the functionalities, nor their relations. The program obtained as the solution operates as a deterministic one and can be fixed once determined. This is the condition of representing problem solving in the form of procedural program though an exploratory operation may be necessary by the subject S2 in finding the solution. For this type of problem solving like making an enterprise model, the making an object model is the more hard and important task than programming itself which can be automated as will be discussed below.

Even if the object-level problem is the one that needs exploratory operation, its programming is still possible if the set of alternatives is finite. Then a procedure for selecting one from among the alternatives, interpreting selected knowledge and backtracking is made, i.e. it is to include an inference operation in the program. But such a program is usually inefficient and a faster program can be made by interpreting and compiling knowledge in advance and including only its result in the program. A table driven program is an example. Every case for decision making can be enumerated in advance by interpreting knowledge off-line and representing the result in the form of decision table consisting of pairs of a value of a control variable and the corresponding operation. Then an exploration is replaced by a table look-up. A program can execute table look-up and call for the corresponding operation.

Before making such a program the definition of the decision table must be given. Let an operation be selected from a set of operations r1(y), r2(y), . . . , rn(y), in which y represents a (set of) variable defined in these operations. Let these operations be represented by z(y). This is a meta-level representation. In general, an item of decision table is a pair(i, z(y)) in which i is an index and z is a corresponding operation name (one of r1 or r2 or . . . or rn). Then the definition of the decision table could be given as decisionTable (tableName, index, z(y)).

The table look-up operation first takes out an index for the given value of x then selects the corresponding operation. The index is obtained by some operation that classifies a continuous control variable x of a known predicate p(x) into a set of finite discrete classes. Let it be classify(x, i). In the program this causes the same effect as control by strategic knowledge in the meta-level in exploratory operation. In other words, the effect of strategic knowledge is included in the program as the control structure of the program. Strategic knowledge confines the scope of the object knowledge to the set (r1, r2, . . . , rn) which is effective for solving the given specific problem. In order to generate the control the following form is used together with the decision table.

index (x, index):-p(x), classify(x,index).
    selectRoutine(x,z(y)):-index(x,index), decisionTable
       (tableName, index, z(y)), callRoutine(x,z(y))
z(y) is substituted by one of r1(y), r2(y), . . . , rn(y) depending on the index value obtained through the classification of the value x to the classes. The predicate deci-sionTable is a high level (meta-level) expression and a specific procedural program is provided to replace it at the time of translation into a procedural program. The predicates index and decisionTable belong to the problem specific knowledge. Therefore these are included in the object model. A special program structure (such as branching/conditional/case-of statement) is generated by using this knowledge, according to the special syntax of the ordinary programming language. When n=2 in selectRoutine, this represents an if-statement. Finally callRoutine(x, z(y)) is a predicate which is used only for transferring operation control to z(y).

callRoutine(x, z(y)):-z(y))

Sometimes a decision tree is made instead of decision table. In this case tree search operation is used instead of table look-up operation.

One may think that the table look-up or the tree search can be represented by a set of the separate first order predicates as follows:

r1(y) :- p(x), index(x, 1).
    r2(y) :- p(x), index(x, 2).
    rn(y) :- p(x), index(x, n).

This is a way of representing the execution of an exploratory operation. But this is not proper for generating a procedural program because, with this representation, it is not possible to represent the procedure to select one out of possible alternatives in a program. This is discussed in section 5.3.2. (One may think these expressions somewhat strange because the variable y appears only in the head. y is a (set of) variable defined in the selected operation. It may or may not be included in p(x) and index(x, i) in the body. In the former case as above, ri(y) behaves as a proposition to the predicates including the variable x. There is no substantial difference between these two cases. For making the expression rather simple, the above expression is used.) In the other cases for which the alternatives cannot be fixed nor finite, the representation of problem solving in the form of procedural program is difficult because it implies interpreting unknown knowledge in the execution of the program. In this case it is better to use a declarative form of expression with an inference engine directly. This is the reason why knowledge representation may often be an alternative to ordinary programming language.

Thus problems are classified into two classes; one which can be translated into procedural programs and the other for which exploration is indispensable at problem solving. In principle, every problem needs exploratory operation for being solved. Among them those for which prior interpretation of knowledge, and therefore run time exploration in a previously known search space is possible, are classified into the first class and can be the object of the automatic programming. The basis for classifying a problem into one of these classes is not always clear when the problem needs exploratory operation but to a certain extent only. It must be decided by the person as depending on the actual problem.

If an object-level problem is classified to the second class, i.e. the problem includes many exploratory operations, then the requirement for S1 is "solve problem" and those of S2 and S3 are "automate the activity of S1" and "automate the activity of S2" respectively. In this case the role of S2 is to extract the necessary and sufficient knowledge chunks based on the model of the object O1. Since the operation of S3 is the same as S2 and every necessary operation can be performed by S2, S3 becomes of no use and no more necessary. To use the three-strata model for this case is not necessary any more and it could be simplified to the case discussed in 4.3. This means that making a procedural program needs an additional operation to exploratory problem solving, and accordingly the more strata. In general, the procedural way of problem solving is more efficient than exploratory way. But it holds true only when the program is used repeatedly. Even if a problem meets the condition of being classified to the first class, an exploration based method may be better if one needs only its one shot operation.

Let the times for generating an exploratory problem solving system, for executing exploratory problem solving, for converting to procedural form and for executing the procedural program be t1, t2 t3 and t4, respectively. Then the total time required to satisfy the person's requirement is t1+n*t2 for the case of using exploratory problem solving directly, and t1+t2+t3+n*t4 for the case of using procedural program, in which n is the number of times the problem is solved repeatedly. In general t2>t4. If and only if t1+n*t2≧t1+t2+t3+n*t4, i.e., (n*−1)t2−n*t4≧t3, converting to procedural program is more effective than to use exploratory method directly.

5.2 The Operations of the Second/Third-Level Subjects

When a problem belong to the first class, a procedural program is made by the second-level subject, S2. The role of the programmer S2 in this case is mostly to find an efficient method to satisfy the given requirement based on the model representation, then to translate it into the computer executable form. The requirement to S2 is then "make a program for O2" instead of "automate the activity of S1". This is different from the problem being in the second class. The role of S3 is to generate an automatic programming system and replaces the human programmer S2 by the system. S3 generates an exploratory problem solving system which is the same as the one presented in 4.3 and, at the same time, a code conversion system as well. Then the exploratory problem solving system thus generated is given some example problems and it solves the problem of finding a path to reach the given goal (to satisfy the requirement given to the object O1). In general, this requires an exploratory operation. The path is generalized to cover all queries which can be given to the system. This generalized path is translated into a procedural program. Thus the following predicate is used to expand the predicate generatesystem in automateActivity.

generateSystem (subject, makeProgram(subject1, object, domain), system:
  generateSystem (subject, solveProblem(subject1, object, domain), system1), . . . *1
  generateSystem (subject, convertToProg(subject1, object, domain), system1), . . . *2
  integrate (system1, system2, system) . . . *3

The predicate *1 is for generating a system to solve problems as depending on the object-level problem. In case of the office program generation above, the system is generated according to the protocol represented in form of the relation between functionalities in enterprise model. The protocol was to define operations for the user's requests like drawing money.

Following to the problem solving, the chain of the predicates which led to the goal is translated into a program code. The predicate *2 in the above rule is to generate a system which is used for translating the chain to a procedural code. Finally the predicate *3 is for integrating these extracted systems into a system.

At exploratory problem solving, usually a solution path is found by backtracking. The exploratory problem solving system not only solves problem but traces the operations and records the path which could succeed in reaching the goal.

In order for the system to trace the problem solving procedure and to record the succeeded path, a special type of inference engine becomes necessary. Since the inference operation is implemented as a special program, it is possible to include this tracing function in the inference engine and allow users to specify the mode of inference; normal mode and trace mode.

The predicate evokeSubject included in the predicate automateActivity (refer 4.3) is a special one to give control to the lower level subject. In reality, it is to urge the system to start the specified operation. The problem solving system interprets the predicate as follows.

evokeSubject (subject, makeProgram(subject1, object, domain), system):-makeProgram(subject1, object, domain)

The predicate makeProgram is composed of problem solving in the trace mode and then of the conversion of the obtained chain to program code.

makeProgram(subject1, object, domain):-solveProblemT (subject1, object, domain, chain), convertToProg (subject1, object, chain, code)

The predicate solveProblemT is the same as the ordinary exploration based problem solving except that it leaves only the path, i.e., a sequence of predicates leading to the goal behind by tracing. It includes problem decomposition when the object problem is large. The predicate convertToProg needs a further consideration which is discussed in the next section.

5.3 Generating a Program Code 5.3.1 Structural components of program

An automatic programming system must be able to generate very complex programs. In general, a complex program can be synthesized as a structure composed from the less complex programs each of which is, in turn, composed from the structure of the still simpler programs. At the leaf of the structure are the primitive programs to do the primitive operations. The primitive programs are the components of making a large program. Developing a large program therefore is to make a structure of these component programs.

In any procedural programming language, every program structure is composed of a limited choice of structural components such as sequence, branch, loop and so on. In addition, the concepts of main-program and subroutine are important from the practical point of view. Hence the system must be able to represent these structural components and to generate any complex program structure by means of these components. In this section the expressions in logic that correspond to the program structural components are discussed.

[1] Subroutine call

A subroutine is a separated part of a program and the reasons to take this structure are the convenience of program development for the first place and saving memory for those parts of program that are repeatedly used. In a logical sense whether to separate a program into a main program and subroutine(s) or not is insignificant. It is therefore no way to represent this program structure by first order logic, but a higher order logic expression is necessary. We can use subRoutine(z(y)) similar to callRoutine(x, z(y)) which was used in the definition of decision table for this purpose. subRoutine(z (y)) generates a subroutine call procedure for the predicate z(y). Let us assume, for example, solveProblemT counts the number of the same predicate being included in the succeeded path in generating the sequence of predicates. If a predicate P is included more than two times, then P is replaced by subRoutine(P) and generate the program for P independently. Binding variables in P may be different in every call. The program P must be defined to include the definition of variables as will be discussed later.

[2] Branch

Branch is an operation to select a path among many by the specified condition. It corresponds to execute the following predicates in an exploratory process.

predicate(x,y):-p(x), condition-1(x), predicate-1(x,y)

predicate(x,y):-p(x), condition-2(x), predicate-2(x,y)

predicate(x,y):-p(x), condition-n(x), predicate-n(x,y)

This means that predicate-i(x, y) is selected as predicate (x, y) if i-th condition holds. We saw in the discussion of a decision table before that in this case only the path is selected as determined by the specific index which a problem generates for a specific input but the others are discarded. The other paths may be selected in the same program for the other inputs. In order to generate a program to cover all the cases that can occur with the required inputs, the set of selection rules as above must be included in a program. A way is to use a decision table. However it is rather a special way. Alternatively it is realized by an integration of the separate rules as follows. It imposes some constraint on knowledge representation as will be discussed in 5.3.2.

predicate(x,y):-p(x), condition-1(x), predicate-1(x,y)+p(x), condition-2(x), predicate-2(x,y)+—+p(x), condition-n(x), predicate-n(x,y)

[3] Loop

A loop is a way of repeating operations. The operation in every cycle of a loop may be different but it must be represented in the same form including a parameter which differentiate each operation. Let i denotes i-th operation cycle. Then there are two cases depending on the way in which i-th operation is defined, i.e., one which is based only on the index i and the other which includes operation including parameters other than i.

(A) This is the case in which i-th operation is closed with respect to i, that is, i-th operation includes only the index i. An example of this case is an operation to obtain a sum of n values, v1, v2,..., vn, in which i-th operation of the loop is defined based on vi, a function only of i. Then the operation is represented such as to include sum=sum+vi and i+1=i in which 'sum' is a variable to represent a partial sum. The loop is repeated until i becomes equal to n.

The 'sum' is not a variable in mathematical sense but is a place holder in programming. It plays an important role to represent every cycle in the same form and allow a repeated operation as a loop. On the other hand, every variable in predicate logic must be defined mathematically and there is no concept of place holder. An alternative method is necessary therefore to represent operations in the same form for all cycles. A concept of set can be used instead of the place holder. Let summing up vi to 'sum' be replaced adding an entity vi to a set s. Thus the set s contains v1, v2, ..., vn when the loop ends. Then an additional operation to sum up all the elements in the set s produces the required result.

The looping itself corresponds to a quantifier in the predicate. As an example, let a predicate (Ax/d1)(Ey/d2)(predicate(x,y),addToSet(y,s))

be evaluated. The readers may note that the link mechanism as have been shown in FIG. 3 had this type of query. Therefore it can be translated into a loop. Coming back to the simple example above for explanation, that predicate says that y meeting a relation predicate(x, y) with respect to x is to be saved in the set s. The variables x and y corresponds to i and vi as above respectively. Then this is Skolemized to an expression like predicate(x,d1, f(x)/d2), addToSet(f(x)/d2, s)

in which some y satisfying the relation predicate(x, y) with respect to x is represented by y=f(x) in the form of mathematical function. This is transformed into a procedural operation such as [while x∈d1, y=f(x) and s=s+y] in which + denotes an add-to-set operation. After the end of the loop, an additional operation to sum up all the elements in s, sumupset (s, v), must be executed.

This is not the best way but some flaws. First, it needs a memory space for the set to contain y=f(x) for all x's. Second, it needs the additional operation sumUpSet (s, v) after the end of the loop. In order to improve these while assuring to generate the same operation as the ordinary loop operation, a special predicate to combine the add-to-set operation and sumup operation is defined such as addSet without violating the logical concept. This predicate has the compound effect such as to add an element to a set and sum up all the elements in the set. For example, if (Ax/d1)(Ay/d2)(Av/d3)(sumUp(x, y, v):-predicate(x,y), addSet(y,s,v))

is provided in the system and the query (Ax,table)(Ey/real)(Ev/real)sumUp(x, y, v)?

(sum up y which corresponds to x in the table) is produced, then the following expression is deduced and transformed into a loop operation, (Ax/d1)(Ey/d2)(Ev/d3)(predicate(x,y), addSet(x,s,v)).

(B) In the other case, in which the operation is not closed with respect to i but include some value relating with i−1, i+1 or so, such an operation as addSet cannot be defined because, in this case, the quantity to be added to the set may not yet be evaluated. A typical example is a recursive function which needs function value with another index than i which may not yet be evaluated. Note that the following discussion is for the purpose of discussing the structure of loop operation and not of discussing the general recursive function.

The above case is further divided into two classes. One is a case in which a recursive function is included in the other known function. This is represented in the mathematical form, f(x, 0)=a f(x, i)=g(x, i, f(x, i−1))

The other is the case in which a recursive function is not covered by the other function such as f(x, 0)=a f(x, i)=f(x, i−1) * g(x, i)

where the function g is a known function and * is an arithmetic operation.

In the logical form these are represented, recursiveFunc(x, 0, a)

recursiveFunc(x, i, y):-recursiveFunc(x, i−1, z), knownFunc(x, i, z, y)

and recursiveFunc(x, 0, a)

recursiveFunc(x,i,y):-recursiveFunc(x,i−1, z), knownFunc(x,i,u), operation*(u, z, y), respectively. The difference between them is either known-Func includes the value of the recursive function of the previous step or not.

In the second case knownFunc can be evaluated at every step and added to a set (s) as was the simple loop case of (A) above since the value of the recursive function at the previous step does not appear in the known function. The operation* defines the operation to apply to the set after the loop ends. Then the value of a recursive function for i=0 is obtained and these of the other cycles are obtained by applying the operation* to the obtained value successively in the reverse order of the loop. Thus the set s must be an ordered set.

In the simple loop case the set could be unordered. Therefore the operation for the set after the loop can be performed in any order and, moreover, it could be moved into the loop. This is the difference between the case of simple loop and that of recursive function. In reality however, if the operation* is commutative like addition and multiplication, then the operation can be achieved in any order and it can be distributed in each cycle of the loop as was the case of the simple loop. If the operation* is not commutative, then the set operation must be done precisely in the reverse order of i and therefore must be done only after the end of the loop.

In the first case, on the other hand, in which a known function includes the value of recursive function, the known function cannot be evaluated until a recursive function is obtained. In this case a loop is formed and the known functions are preserved unevaluated in a set. When a known value for a recursive function is reached, the loop ends, and the given functions are evaluated successively in the strictly reverse order of the loop. This operation cannot be moved in the loop but the second loop is necessary after the first loop for obtaining the required value of the recursive function.

There can be the more complex cases such as a two-way recursion like, f(x, i)=f(x, i−1) * f(x, i−2).

This is classified into [B] by the above classification. In converting them to procedural programs the ordinary compiling technique is used. This is not the matter to be discussed here.

[4] Database access

Use of database is becoming more and more important. Since the database is an independent system from the application problem, a method of accessing to databases must be provided. Actually the database, especially relational database, and logic are very close conceptually and it is possible to generate the database access procedure, by SQL for example, automatically. There were a number of research projects on this issue and the author and his colleague discussed the way in the above-mentioned reference [YAM90]. It is abbreviated here.

5.3.2 A special way of knowledge representation

Let us suppose that the exploratory problem solving system generated by the highest stratum subject (S3) could find a sequence of predicates to reach the goal from the given problem. In order to generate a procedural program from the sequence, a special way of knowledge representation (a structured way of generating the sequence of predicates) becomes necessary. As was seen before some basic operation unit like branch is represented by two or the more predicates in the ordinary declarative rule representation. This is inconvenient in translating into procedural form and is integrated into a single form including disjunction if necessary as the branch operation was represented by a single rule instead of juxtaposing the different cases.

(Az/d1)(Ay/d2)[predicate(x,y):-p(x), condition-1(x), predicate-1(x, y)+p(x), condition-2(x), predicate-2(x, y)+—+p(x), condition-n(x), predicate-n(x, y)]

Prefix normal form representation, i.e. the representation in which quantifier and variable with its domain is common to all predicates in a formula and put at the head as above, is possible if and only if these are the same for all separate predicates before integration for every variable. Hereafter it is assumed that this condition is met. Similarly to the branch operation, the decision table operation and recursive function are represented in the integrated form as follows.

selectRoutine(x, z(x)):-p(x), classify(x, i), decisionTable (#tableName, i, z(x)), callRoutine(x, z(x))

recursiveFunc(x, i, y):-recursiveFunc(x, 0, a)+recursiveFunc(x, i−1, z), knownFunc(x, i, z, y).

In order to avoid a difficulty expected to arise logically in dealing with the disjunctive expression, it may be better to restrict it only to the exclusive disjunction, i.e. one and only one in the disjunction is true at a time. It is not necessary nor desirable to assume order-sensitivity.

It is to be noted that a set of the predicates with the same head but with the different domains, (Az/d1)[predicate(x):-predicate-1(x)], (Az/d2)[predicate(x):-predicate-2(x)], (Az/dn)[predicate(x):-predicate-n(x)], can be integrated into a disjunctive form having the union set of d1, d2 ,. . . , dn as the domain, (Ax/d)[predicate(x):-(x∈d1), predicate-1(x)+(x∈d2), predicate-2(x)+—+(x∈dn), predicate-n(x)](*)

in which $d=U_{i-1 \ to \ n} \ di$.

This gives a rule to interchange between a set-theoretical and a logical expressions. This rule is used in generating branch operation as shown in the next section.

Let there be a set of rules in which the condition parts may not be mutually exclusive.

predicate(x, y):-p(x), condition-1(x), predicate-1(x,y)

predicate(x, y):-p(x), condition-2(x), predicate-2(x,y)

predicate(x, y):-p(x), condition-n(x), predicate-n(x,y)

The rules are then classified into the different sets such that the rules in each of the sets are mutually exclusive. There may be the different ways of classification. It is desirable that the number of the sets be the least. The rules in a set are merged in a disjunctive rule. A separate disjunctive rule is made corresponding to the different sets:

predicate(x y):-p(x), condition-a1(x), predicate-a1(x, y)+—+p(y), condition-ak(x), predicate-ak(x, y)

predicate(x y):-p(x), condition-b1(x), predicate-b1(x, y)+—+p(x), condition-bm(x), predicate-bm(x, y)

predicate(x y):-p(x), condition-p1(x), predicate-p1(x, y)+—+p(x), condition-pn(x), predicate-n(x, y)

It is desirable that the disjunction in each rule is not only exclusive but exhaustive, i.e., every value x of p(x) meets exactly one and only one condition in a disjunctive rule. In this case everything can be done with a single disjunctive rule. All the other rules are redundant and can be discarded. Or, if there are the other rules meeting this condition, the best one is remained. Since the disjunctive rule is converted to a branch operation in the procedural program, the rule with the least disjunction is the best. But usually this condition is not met when the rules are made unintentionally to be so. In this case more than one disjunctive rule are remained. This is the matter of rule design.

Among all predicates in a knowledge base some predicates are called terminal and are marked accordingly. Predicates accompanied with some specific procedure, so-called procedural (built-in) predicate, are the terminal predicates. The predicates representing the program structures such as 'branch' and 'loop' and those concerning with the database access as discussed before are also dealt with as the terminal predicates tentatively for the convenience of transformation.

5.3.3 Generation of a sequence of predicates as a source of programming

In order to generate a procedural program the second stratum subject S2 studies first a way of satisfying the given requirement like drawMoney in an office system. In case of automatic programming system, this is to solve the problem using domain knowledge by exploration. The result is a deduction tree composed of the related predicates in the knowledge. By tracing the problem solving, only the predicates to generate the succeeding path are included in the tree.

For example, an input format is defined for a money-drawing operation to form a problem in the office application. It includes variables and each variable has its domain. Its internal form is (Ax/person)(Ay/person)(Az/day)(Au/time)(Av/integer) (Aw/integer) drawMoney(x, y, z, u, v, w)

where x; subjTeller, y; clientName, z; date, u; time, v; accountNumber, w; drawAmount. It encompasses various instances. The scope of the instances it covers and consequently the scope of generated program depends on the domains of the variables in the expression. Since each variable domain is independent to each other in the above expression, it is possible to include some combinations of the instances which does not occur in the real world. These are don't-care cases. It may be possible to make the input format to exclude these cases. But it makes the requirement expressions complicated and brings some inconvenience to users. Unless the don't-care cases have a bad effect, they can be included in the scope of the program. Otherwise, the program is required to check the legality of the input.

In order that the program be able to accept every instance in the scope of the input, the program should have variables to encompass the possible cases of input. One way to assure this, if possible, is to try to solve this problem including variables (called simply the general problem hereafter) by exploration. If a solution could be found, then the generated path and accordingly the program generated therefrom by transformation encompasses all the required cases. This simple approach of handling all the cases uniformly is not always successful however because different instances may require different processing. For example, it is difficult to obtain a solution for a general problem if it includes database access because this is an instance-based operation. The cases requiring the different processing must be classified.

Before to try to solve this general problem directly, an instance problem is generated from the general problem by tentatively specifying the constant values for the variables, then this instance problem is solved. The reason of doing so is twofold; first, a deduction tree produced for this instance problem (instance tree hereafter for short) can be used effectively to create the deduction tree for the general case (general tree for short) in most cases and, second, if it could not get a solution, then it tells that the prepared knowledge is not sufficient and persons can know in early time that the general problem cannot be solved.

Thus first the instance problem is solved by exploration. This results in an instance tree. Then it is generalized to result in a general tree. Since mostly the same rules are referred to as those for the instance problem for solving the general problem, the basic structure of the deduction trees for both cases are similar (but not exactly the same). For the purpose of generalization, every node is reviewed successively starting from the top and the predicate is generalized. At the top, this is to replace the instance problem to the original one.

There is already a sub-structure originating from the predicate that was generated for the instance problem. Let the rule used there be of the form A:- B1, B2, . . . , Bn to which A is unified with the predicate of the instance problem (instance predicate hereafter). Then an AND tree composed from B1^, B2^, . . . , Bn^ is generated where Bi^ denotes Bi (i=1,2,. . . , n) of which variables and quantifiers are modified by the unification with the instance problem. Then the next level nodes, B1^, B2^, . . . , Bn^ are tried to be generalized. It is not to put them back to Bi's because the original form of the rule may not be a proper rule (A may not be unifiable with the original problem). This checking and generalization are performed as follows. For ease of explanation the case of single variable is shown here.

Let the original predicate, the rule, and the deduction be represented $(Qsx/S)F(x)$, $(Qtx/T)[F(x) :- G(x)]$, and $(Qrx/R)$ $G(x)$ respectively in which $(Qs, S)$, $(Qt, T)$, and $(Qr, R)$ are (the quantifiers, the domains of the variable x) of the query predicate, the rule and the result respectively. Then the propriety of the rule and $(Qr, R)$ are obtained from the first two from the inference rule as is shown in Table 1. This table shows the unifiability condition by the relations between the domain sets and the quantifiers of the query predicate and the rule as well as the domain and quantifier of the deduction. For the more general case refer to S. Ohsuga and H. Yamauchi, Multi-Layer Logic—A Predicate Logic Including Data Structure As Knowledge Representation Language, New Generation Computing, 1985.

Thus the new quantifier and the domain of variable for the new predicates are determined. Thus the predicates B1', B2', . . . , Bn' are obtained as the generalized predicates. This operation is repeated to the bottom.

TABLE 1

Inference rule of MLL

| (Qs, S) | (Qt, T) | Unifiability Condition | (Qr, R) |
|---------|---------|------------------------|---------|
| (A, S)  | (A, T)  | $S \subseteq T$        | (A, S)  |
| (E, S)  | (A, T)  | $S \cap T (= Z) \neq$ empty | (E, Z) |
| (E, S)  | (E, T)  | $S \supseteq T$        | (A, T)  |
| (A, S)  | (E, T)  | None                   | (—, —)  |

It can happen that A:- B1, B2, . . . , Bn was proper to the instance problem but not to the general problem because variable domain of the rule is smaller than that of the general problem. In the latter case, the other rule must be looked for. If there is an alternative one A :- C1, C2, . . . , Ck with the greater variable domain, the sub-structure below A is canceled and the process starts from scratch with the new rule. If there is no such rules, the problem cannot be solved with any existing single knowledge. There is a possibility of combining some rules with the same head to generate a disjunctive rule of which the domain of variable is the set-theoretical union of the domains of the rules. If this disjunctive rule satisfy the condition as shown in Table 1, then the original sub-structure is replaced by a disjunctive (OR) node which is translated to a branch operation.

Figure 16:
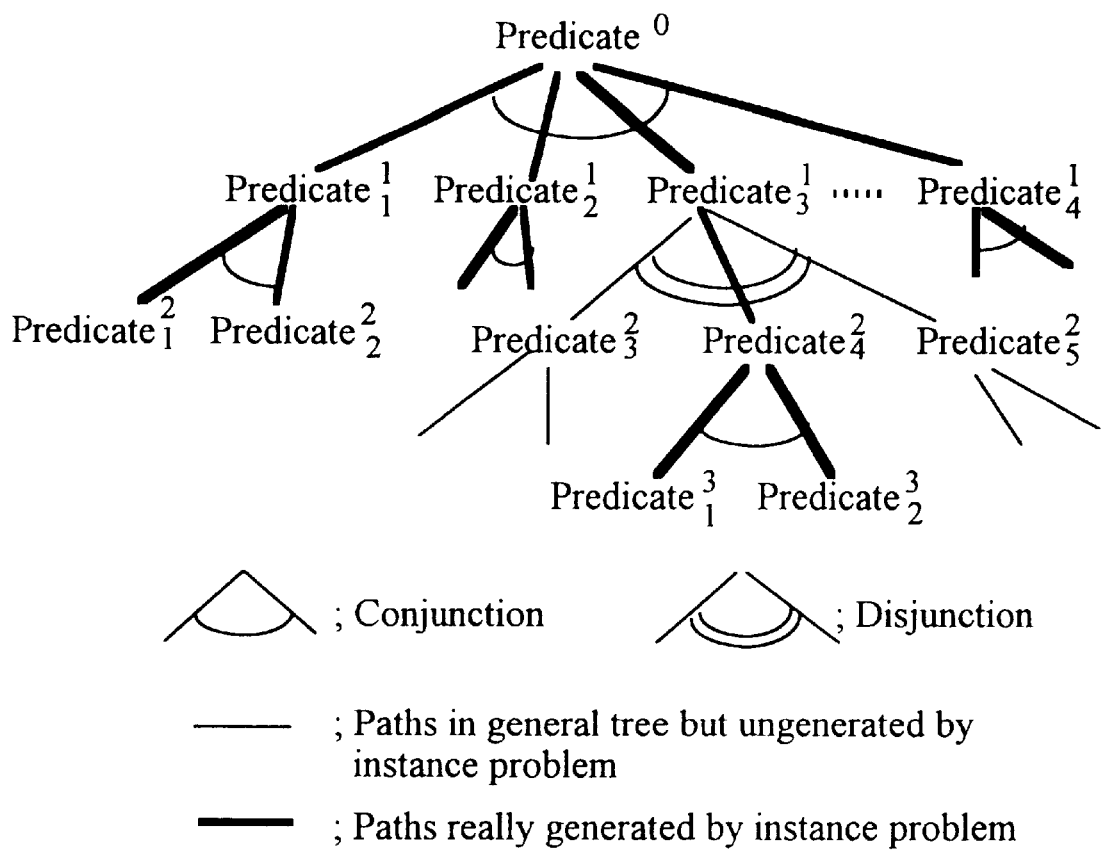
FIG. 16 illustrates a deduction tree.

Or, a disjunctive rule could be used in the instance problem. If exclusiveness is assumed to the disjunctions as have been discussed in 5.3.2, then the alternative paths can be considered separately. As can be seen from FIG. 16, for the instance problem, only a predicate that holds true for the given problem can be selected in this disjunction and the deduction proceeds further along the selected predicate.

For general problems this is not the case but the disjunctive expression must be considered as the deduction as a whole. If a disjunctive rule of the form A:-D1+D2 +—+Dm is used, then a disjunctive sub-structure composed of D1, D2, . . . , Dm must be made first and the predicates must be generated. It corresponds to a branch or a loop operation. In a disjunctive rule there is at least one variable that discriminates the cases. In the example of branch operation shown before it was x. In generalizing this sub-structure, the domain of this variable in the rule must include set-theoretically the domain required in the problem. Technically, the set-theoretical union of the scopes of this variable in the separate predicates in the disjunctive rule must include that of the problem. For the other variables the same discussion as above holds. For example, in the disjunctive rule (*) as given above, the domain d as the set-theoretical union of the scopes of the variables in the separate predicates must include the domain of the corresponding variable in the problem.

Contrarily, the domain d is much larger than the required domain dp of the problem and, in some predicate, say predicate-n(x), the scope of this variable dn may be out of dp. Then the predicate should be erased in order to generate a least necessary branches.

If di, (i=1, 2,. . . ,n), are not mutually disjoint, then some difficulty arises. For example, let di and d2 be not disjoint. Let d1=d1'+c and d2=d2'+c in which di' and d2' are disjoint. In this case, either predicate-1 or predicate-2 can be selected for x in c. It can happen that, depending on this selection, the problem may or may not be solved. The system must be able to divide c into c1 and c2 such that predicate-1 and predicate-2 are selected for the domain d1'+c1 and d2'+c2 respectively so that the problem can be solved. Assuming that the number of rules is finite, it is possible to make disjunctive rule in this way.

Propriety of the rule is checked and OR sub-tree is generalized in this way. In the instance tree, only the node that matched with the instance problem has the sub-tree below it. The deduction sub-trees starting from the other nodes must be generated in order to make the general tree. The new procedures must be originated from these nodes regarding the predicates as problems.

Another disjunction can appear in a disjunction sub-tree to represent a loop operation. In this case a multiple loops is generated. Database access also forms a special sub-tree. Its content depends on the database schema and the requirement.

Nodes corresponding to branch, loop and database access in a general tree are given the mark to show that the respective commands are to be inserted in generating a procedural program.

While solving instance problem by exploration, procedural predicates may be reached. A procedural predicate is such a predicate that has a procedure to evaluate the predicate. The deduction path ends here and the predicate forms the leaf nodes of the tree. The mark is also given to the predicate to show that it can be replaced by the accompanying procedure.

5.3.4 Data structure

Data structure is important as well as program structure. Different from the program structure that concerns problem solving procedure, a data structure concerns an object to which the problem is created. That is, data structure is a computerized representation of object model structure. It should be included in the predicate as a term, and knowledge representation language must be so designed to allow it. For example, in the expression F(O, V) introduced in section 2.2, the term O can be an expression including data structure. In this way data structure is included naturally in knowledge and model representation.

There is no reason to differentiate the representation of data structure used in knowledge and model representation from that used in the procedural program. The same data structure can be used. Then predicates are transformed into procedural program without changing the definition of the data structure.

There must be two types of predicates with respect to data structure; one for evaluating or describing data structure and the other for manipulating it. The latter one can be a procedural predicates of which procedures behind them execute the operations specified by the predicates.

5.3.5 Transformation into a procedural program

In this way the general tree is formed. This tree is transformed into the procedural code. The predicates at the terminal in the tree is threaded in the order from the left to the right to form a sequence of the predicates. The sub-trees starting from a branch are processed separately from the main tree. A set of subsequences of predicates thus generated are merged finally. The source code of the procedural program is generated in this way as described in C. Y. Li, and S. Ohsuga, A Meta Knowledge Structure for Program Development Support, Pro. 5th Intn'l Conf. on Software Engineering and Knowledge Engineering (SEKE), 1993.

It is possible to divide the general tree into parts so that each part can be processed in parallel. Every procedural predicate in this sequence is replaced by its backing procedure to generate the procedural program. Every variable in a predicate is given a domain with the quantifier in the prefix as determined by the rule shown in Table 1. In translating into procedural program, the type and the scope of every variable can be specified based on the domain of the variable. For example, a procedural predicate (Ax/integer) (Ey/real)inverse(x, y) is translated into int x; real y; y=1/ x; Every predicate is processed one by one from the top as follows.

(0) For every variable in a predicate, its type and scope are declared as above, (1) identify the predicate type ; procedural predicate/loop/ branch/database access (or the access to other, independent systems), (2) the procedural predicate is replaced by the accompanying procedure, (3) for a loop type predicate, the loop type is analyzed, a loop structure provided for each type is introduced with the additional operation if necessary (such as evaluating the functions in a set as was discussed in the recursive function), and the subsequence generated from the sub-tree independently is embedded in the loop, (4) for a branch type predicate, a branch command is prepared, and the subsequences generated from the sub-trees are combined with the branch, (5) for database access, an access sequence is generated and it replaces the predicate.

5.3.6 Consideration

[A] A procedural program is generated in three steps; instance problem solving, generalization of the deduction tree and conversion to the procedural program. The first two steps are for obtaining the path to the given goal which is used as the source of program. These steps are problem solving by exploration. An input format is decided for the problem. The objective is to obtain the deduction tree (the general tree) for the given problem. If it could be obtained in whatever way, the goal is reached. The instance problem is used to facilitate the process.

There are three possible cases on the outcomes of these problem solving process. These are;

(1) an instance problem cannot be solved.

(2) an instance problem can be solved but the general tree cannot be obtained.

(3) an instance problem can be solved and the general tree can be obtained

If an instance problem cannot be solved, then knowledge provided in the system is not sufficient and must be reconsidered. The deduction tree at the time the processing stops should be displayed for the convenience of persons who should find what knowledge is missing.

The second case implies various difficulties. The substantial one is the way of making the disjunctive rules. A general problem (including variables) represents a set of the instance problems. A rule may be used for solving an instance problem but another rule (with the same conclusion (head)) may be necessary for the other instance. Therefore one needs the set of these rules that are used for each instance problem. It is assumed here that there exists a number of alternative rules with the same head. If the quantifiers and the domains of variables are the same, these can be combined together and represented formally by a disjunctive rule. If the rule build up in this way can be a deduction of the given problem, then a branch operation can be generated. Thus the more the alternatives are, the larger flexibility the system acquires.

If all alternatives could be identified in advance and an exhaustive and exclusive disjunctive rule has been made, only this rule may be used and the other rules are discarded. In this case, the best procedural representation may be generated. If, on the other hand, the necessary alternatives can not be represented by a single disjunctive rule but are distributed to several rules, then a set of branching operations must be generated.

The largest problem is the way of identifying the necessary rules correctly. There are two possibilities of solving this problem: to use many instances and to analyze the structure of the rules selected by the instance problems. By using more instances, the set of necessary rules can be identified more correctly. But it is not easy to decide a best set of instances. On the other hand, if the rule selected for solving an instance problem contains some predicate that classifies the possible cases, then there is a reason to think that alternatives other than the selected one exist. These alternatives have the same head as the selected one but with different classification condition in the predicate. These rules are closely related to each other and can be combined to a disjunctive rule. This syntactic method of forming a disjunctive rule is not complete. Two methods discussed above, i.e. to use many instances and to use the syntactic method of forming a disjunctive rule must be used together in order to identify the set of necessary rules as correctly as possible.

[B] Furthermore, a variation of the above-mentioned method can be achieved by generating the detailed specification of variable like double length.

[C] Automatic programming is possible by making use of a pre-defined set of procedural predicates. The problem solving by exploration proceeds top-down to find the way to reach the given goal by forming a structure of the predicates as a deduction tree. This exploration proceeds until the terminal predicate including the procedural predicate is reached. This deduction tree provides a program structure to represent the problem solving. Automatic programming is an automatic procedure to make a deduction tree and to translate the structure to a pre-defined procedural program.

A procedural predicate is a component program with which any large scale program is composed. There can be different types of component programs. Some of these are to represent very basic programming techniques such as for manipulating data structure. This class of programs are used widely in the different problem domains. The others are the domain specific component programs to represent the basic concepts in each problem domain. The set of component programs of this type cannot be fixed in advance because the programs which are used repeatedly may change as the technology in this domain advances or, for a group of people who are working in a rather narrow problem area in a domain, some special concepts may be used repeatedly in the group and it is convenient for them to let these concepts be represented as the procedural predicate. Therefore the language must be able to allow users to define arbitrarily the procedural predicates in such a way that the user develop a procedural program in an ordinary programming language and register it in the system with a predicate.

6. CONCLUSION

The objective of intelligent systems is to provide persons with the best way to solve problems. As has been discussed, user's problems are classified into two classes; those which can be represented in the form of procedural program and the others. Thus the above objective is decomposed into two parts; to develop a procedural program for the first class of problems and to find the solution in a time as short as possible for the second class of problems. Both classes require exploratory problem solving but the extent and the structures of search space for their solutions are different. For the first class of problems, the solution space is confined to a set of the combination of the discrete rules that have been presented to the system in advance. This set may become large but in many cases remains still finite. Though exploration is necessary, it is relatively easy when compared to the second class of problems because it is better known about solution for this class of problem comparing with the second class. The more serious problem for this class of problems is how to specify the problem precisely and to translate problem solving process into procedural form.

The second class problems are those which require to find the object model structure to meet the given condition as the solution. The search space is the set of possible structures, which is very often infinite. The largest problem in this case is to confine the practical search scope in a reasonable way as the actual situation requires. Since the use of strategic knowledge plays an important role here, an architecture to define and use strategic knowledge must be defined.

In order to achieve these goals several new ideas are proposed in this disclosure. Problem solving process is separated into two stages; externalization and exploration. Man-computer interaction is essential for the former but is not essential though unavoidable for the latter. A model-based externalization is proposed for the man-computer interactive specification of a problem. The multi-strata modeling scheme has been defined as being a model of problem solving process including persons. Standing between externalization and exploration, this modeling scheme connects these operations.

The approach taken for the automation of the exploration is first to develop a general purpose problem solving system which can accept different type of problems, then to generate a problem-specific problem solving system automatically from the general purpose system. As a cue for extracting only knowledge which is necessary for solving given problems from very general knowledge sources, the multi-strata model is used. A few examples of making multi-strata model and also of processing it to generate a required system have been discussed. Through this discussion a way of automating the design of automatic systems was opened. One of its most important applications is automatic programming.

In order to implement this idea a special representation language is needed. Its required characteristics are as follows.

(1) It must be a completely modular language;
(2) It must be able to represent any kinds of data structures which are needed to represent the objects to be considered;
(3) It must be able to represent meta-knowledge;
(4) It must be able to define procedural predicates.

The first requirement is necessary for exploratory problem solving on the basis of knowledge processing and for assuring flexibility. Predicate logic is well suited for this purpose.

The second requirement is indispensable for model based problem solving. Being structured is an important aspect of an object model. Functionalities of the model are produced as depending on the structure. Moreover, problem solving by exploration includes very often model analysis and model modification as well. The second condition enables to represent explicitly the model representation and its manipulation.

The third requirement is for making the intelligent system more flexible and practical. Meta-knowledge is used in many parts in the system. The typical uses are; representing the exploratory problem solving process and control, implementing a multi-layer knowledge structure suitable to intelligent function structure, for representing a program structure etc.

The fourth requirement is for integrating traditional procedural programming and new, non-procedural problem solving.

Such a language has been developed by the inventor's group and named Multi-Layer Logic (MLL). The outline of this language is presented in Appendix. An intelligent system named KAUS (Knowledge Acquisition and Utilization System) has been developed based on MLL. The system has been used in a number of design type problems. Now the author is preparing to start an experiment of automatic programming.

APPENDIX MULTI-LAYER LOGIC (MLL)

In order to represent the concepts discussed so far a special kind of knowledge representation is necessary. It must be able to represent the multi-strata model and its operation as well as multi-level representation architecture. A language to meet this condition is discussed in the above-mentioned references [OHS83, OHS95a]. It is presented here in brief because it is necessary to understand the discussion in the disclosure. This language is named MLL and illustrated in FIG. 17.

This language is an extension of first order logic. The main extensions are (1) introduction of a method of manipulating data structure, (2) high order predicate under certain restrictions, and (3) their combination. The data structure is based on the axiomatic (Zermelo-Fraenkel) set theory and the language has a capability to define a new data structure as a compound of the primitive relations by a set of composing operations. The primitive relations are; element-of (is-a), component-of, product-of, power-of, pair-of. The basic form to represent knowledge is, (Qxx/X)(Qyy/Y)—(Qzz/Z)[R(x, y, —, z):-P1(x, y, —, z) * P2(x, y, —, z) *—* Pn(x, y, —,z)]

in which Qx etc. denotes either the universal quantifier (A) or the existential quantifier (E), x/X etc. means x in a set X, * denotes a logical connector, i.e., either conjunction or disjunction. This expression is read as "For all/some x in X, all /some y in Y, . . . , all /some z in Z, if the relation P1 and/or P2 and/or . . . Pn hold, then R". The prefix is often abbreviated for the sake of simplicity of expressions.

An evaluation of predicate is a mapping from a set of variables (x, y, . . . ,z) to either True or False (T, F). This mapping can be performed by a procedure. A predicate to which a procedure for evaluation is provided is named a Procedural Type Predicate (PTP). The others are NTP (Normal Type Predicate). When a PTP is to be evaluated the corresponding procedure is evoked and executed.

Any variable (say x) can be a structural variable to represent a structure. In this case X is a set of structures. For example, if X is a product set of the sets D1, D2, . . . , Dm, then x represents a tuple (d1, d2, . . . , dm) of which di∈Di. Moreover, any term can be a closed sentence which means a predicate without free variable. For example a predicate of the form P(x, . . . , y, S(u, . . . ,w)) can be used. Any of the variables in S, i.e. u, . . . ,w, must be different from the other variables in the predicate P, i.e. x, . . . ,y.

Figure 17:
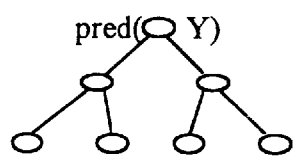
FIG. 17 is a schematic diagram of Multi-Layer Logic (MLL).
Figure 17:
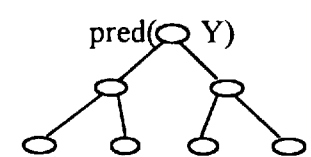

As a combination of these two expansions, any variable can be a structural variable of which the domain is a structure of predicates (as denoted by (c) in FIG. 17). Using MLL as a knowledge representation language a knowledge based system named KAUS (Knowledge Acquisition and Utilization System) has been developed by the inventor's group as described in the above-mentioned reference [YAM93] and used for many problems, as described in J. Guan and S. Ohsuga; An Intelligent Man-Machine Systems Based on KAUS for Designing Feed-back Control Systems, Artificial Intelligence in Engineering Design, Elsevier Science Pub. Co. 1988, the above-mentioned reference [SUZ93], and the above-mentioned reference [YAM90]. The system is designed to accept any PTP as a pair of predicate and its evaluation procedure. The ideas on intelligent systems discussed so far are represented by this language.

What is claimed is:

1. A method for solving a problem in an intelligent information processing device having an intellectual function in a form of a structured knowledge base, the method comprising the steps of:

(a) defining a first level subject performing activities and a first level object to which the activities performed by the first level subject are to be directed, providing a request to define a problem at said first level with said first level object, and building a first level model from the first level object in response to a said first level subject's interest, said first level being corresponding to a first level of problem solving levels;

(b) defining a current level subject performing activities, a request for said current level subject and a current level object to which the activities performed by the current level subject are to be directed, said current level being corresponding to one level higher than a previous level of the problem solving levels at which the last model is built up and said current level object representing activities of said previous level subject during a building of the previous level model, providing a task to be executed by the previous level subject with said current level object, and building a current level model representing said current level object on the basis of an analysis of activities of said previous level subject;

(c) repeating the step (b) in order to cause the model to be hierarchical until a problem solving level at which a given problem is to be solved can be achieved; and (d) sequentially interpreting a request to each subject at a level of hierarchically structured levels from the upper most level to the lower level, identifying a type of problems corresponding to the request and executing a particular activity in response to the request.

2. The method as claimed in claim 1, if said request for said each subject is corresponding to a request for automating an activity of a subject one level lower than said each subject, the step (d) comprising the steps of:
- (d1) on the basis of a one level lower request supplied to an object one level lower than said each subject, extracting any necessary parts of the knowledge base corresponding to the intellectual function to achieve a necessary activity, combining the extracted parts of the knowledge base into an integral structure, and generating a problem solving machine;
- (d2) on the basis of a two levels lower request supplied to an object two levels lower than said each subject operating said problem solving machine, deleting any knowledge other than the knowledge used for an operation of said problem solving machine by monitoring the operation of said problem solving machine, and generating a machine for solving a specific problem; and
- (d3) by means of said machine for solving the specific problem, replacing said subject one level lower than said each subject during a building of said first level.

3. An intellectual information processing device for solving a problem represented in a form of a model, comprising an intellectual function knowledge base which is structured such that an upper layer function corresponding to a more complex function is represented by lower layer corresponding to less complex function, the device further comprising:

- means for building a multi-strata object model hierarchically representing a relation between a subject for solving a problem and an object to which activities performed by the subject are to be directed,
- problem solving means for selecting some knowledge from said intellectual function knowledge base in accordance with a situation to be concerned and sequentially modifying said model based on the selected knowledge, thus achieving a final model for creating a solution of the problem; and
- means, in response to a request supplied to an upper level subject in the multi-strata object model, for extracting some parts of said intellectual function knowledge base and generating a problem-specific solving machine for replacing a lower level subject in the multi-strata object model.

* * * * *